US012812511B2

(12) United States Patent
Munir

(10) Patent No.: US 12,812,511 B2
(45) Date of Patent: *Nov. 24, 2026

(54) REMOTELY ACTIVATED MOBILE DEVICE BEACON

(71) Applicant: Robert Bosch GmbH, Stuttgart (DE)

(72) Inventor: Sirajum Munir, Pittsburgh, PA (US)

(73) Assignee: Robert Bosch GmbH (DE)

( * ) Notice: Subject to any disclaimer, the term of this patent is extended or adjusted under 35 U.S.C. 154(b) by 642 days.

This patent is subject to a terminal disclaimer.

(21) Appl. No.: 17/876,269

(22) Filed: Jul. 28, 2022

(65) Prior Publication Data

US 2024/0040480 A1 Feb. 1, 2024

(51) Int. Cl.

| | |
|---|---|
| ***H04W 48/10*** | (2009.01) |
| ***H04W 72/0453*** | (2023.01) |
| ***H04W 72/541*** | (2023.01) |
| ***H04W 88/04*** | (2009.01) |

(52) U.S. Cl.

CPC ....... *H04W 48/10* (2013.01); *H04W 72/0453* (2013.01); *H04W 72/541* (2023.01); *H04W 88/04* (2013.01)

(58) Field of Classification Search

None

See application file for complete search history.

(56) References Cited

U.S. PATENT DOCUMENTS

| | | | | |
|---|---|---|---|---|
| 10,327,127 | B2 * | 6/2019 | Zhao | H04W 76/14 |
| 10,382,942 | B2 | 8/2019 | Coulis et al. | |
| 10,431,064 | B2 * | 10/2019 | Howard | G06V 40/172 |
| 11,491,911 | B1 * | 11/2022 | Fowler | H04W 4/44 |
| 2012/0149414 | A1 * | 6/2012 | Krishnaswamy | H04W 72/1215 455/507 |
| 2013/0094484 | A1 * | 4/2013 | Kneckt | H04W 48/16 370/338 |
| 2014/0195256 | A1 * | 7/2014 | Wagner | G06Q 10/0633 705/2 |
| 2015/0281974 | A1 * | 10/2015 | Ghasemzadeh | H04W 72/0453 455/454 |
| 2015/0348146 | A1 * | 12/2015 | Shanmugam | G06Q 20/3829 705/27.2 |

(Continued)

FOREIGN PATENT DOCUMENTS

| | | |
|---|---|---|
| CN | 110888110 A | 3/2020 |

OTHER PUBLICATIONS

Yiwei Jin et al., "3D reconstruction using deep learning: a survey," Communications in Information and Systems, 2020, vol. 20, No. 4, pp. 389-413.

(Continued)

*Primary Examiner* — Phirin Sam

(74) *Attorney, Agent, or Firm* — Dickinson Wright PLLC

(57) ABSTRACT

In one embodiment, a mobile device includes a long-range transceiver, a medium-range transceiver, and a controller. The controller is configured to receive, from the long-range transceiver, a medium-range ID associated with a remote medium-range transceiver, transmit, via the long-range transceiver, an ID, channel, and band of the medium-range transceiver, connect, via the medium-range transceiver, to a remote medium-range transceiver based on the medium-range ID, transmit, via the medium-range transceiver, a beacon of data packets at an interval.

20 Claims, 15 Drawing Sheets

(56) References Cited

U.S. PATENT DOCUMENTS

| | | | | |
|---|---|---|---|---|
| 2016/0062778 | A1* | 3/2016 | Hill | G06F 8/20 717/100 |
| 2016/0112947 | A1* | 4/2016 | Sahoo | H04W 4/80 370/311 |
| 2016/0234786 | A1* | 8/2016 | Gaja | H04L 43/16 |
| 2017/0048777 | A1* | 2/2017 | Morita | H04W 76/11 |
| 2017/0086204 | A1 | 3/2017 | Jung et al. | |
| 2017/0256034 | A1* | 9/2017 | Bai | G06F 3/147 |
| 2017/0285641 | A1* | 10/2017 | Goldman-Shenhar | B60W 60/00136 |
| 2017/0339739 | A1* | 11/2017 | Pallen | H04W 12/04 |
| 2018/0091948 | A1 | 3/2018 | Mappus et al. | |
| 2018/0096545 | A1 | 4/2018 | Spahl et al. | |
| 2018/0184380 | A1* | 6/2018 | Xue | H04W 4/80 |
| 2018/0196416 | A1 | 7/2018 | Lagnemma et al. | |
| 2018/0341274 | A1 | 11/2018 | Donnelly et al. | |
| 2018/0365975 | A1 | 12/2018 | Xu et al. | |
| 2019/0110197 | A1* | 4/2019 | South | H04W 12/06 |
| 2019/0128683 | A1 | 5/2019 | Kristinsson et al. | |
| 2020/0296779 | A1* | 9/2020 | Moghe | H04B 3/544 |
| 2020/0314590 | A1 | 10/2020 | Odejerte, Jr. | |
| 2020/0359215 | A1 | 11/2020 | Akpinar et al. | |
| 2020/0380563 | A1* | 12/2020 | Shiffert | H04W 4/023 |
| 2020/0383153 | A1 | 12/2020 | Agarwal et al. | |
| 2021/0016776 | A1* | 1/2021 | Weiser | G09F 9/00 |
| 2021/0405173 | A1 | 12/2021 | Elias et al. | |
| 2022/0024476 | A1 | 1/2022 | Lund et al. | |
| 2022/0135085 | A1 | 5/2022 | Wright et al. | |
| 2022/0141624 | A1* | 5/2022 | Howard | H04W 4/20 455/457 |
| 2022/0322085 | A1* | 10/2022 | De Vegt | G07C 9/00309 |
| 2023/0209469 | A1* | 6/2023 | Foster | H04W 52/028 455/457 |
| 2023/0296785 | A1* | 9/2023 | Sharma | G01S 19/215 342/357.59 |
| 2023/0300690 | A1* | 9/2023 | Tabet | H04W 36/06 370/331 |
| 2023/0421207 | A1* | 12/2023 | Ellenbeck | H04B 7/04013 |
| 2024/0007148 | A1* | 1/2024 | Ellenbeck | H04B 7/06952 |
| 2024/0045016 | A1* | 2/2024 | Munir | G01S 5/0284 |
| 2025/0082840 | A1* | 3/2025 | Patel | A61B 5/0022 |

OTHER PUBLICATIONS

Book David Tse et al., “Fundamentals of wireless communication,” Dec. 9, 2004, Cambridge university press, 2005, 644 Pages.

Wesbite https://medium.muz.li/uber-compass-an-ar-ux-ui-case-study-569dd2e9f650 Nikhil Muzli, “Uber Compass, an AR UX/UI Case Study,” dated Jul. 16, 2020, Retrieved Jul. 28, 2022, 35 Pages.

Wesbite https://www.air802.com/sector-antenna-wifi-2.4-ghz-12-dbi-180-degree-vertical-polarized.html “Sector Antenna, 2.4 GHz WiFi, 12dBi, 180 degree,” Retrieved Jul. 28, 2022, 3 Pages.

Wesbite https://www.signalbooster.com/products/wifi-5-ghz-and-2-4-ghz-directional-10-dbi-panel-antenna “WiFi Antenna: 5 GHz and 2.4 GHz Directional 10 DBi Panel Antenna,” Retreived Jul. 28, 2022, 7 Pages.

Shiwei Fang et al., “EyeFi: Fast Human Identification Through Vision and WiFi-based Trajectory Matching,” Int. Conf. Distrib. Comput. Sens. Syst. Workshops, May 2020, pp. 59-68.

Daniel Halperin et al., “Tool Release: Gathering 802.11n Traces with Channel State Information,” ACM SIGCOMM Computer Communication Review Jan. 2011, vol. 41, No. 1, pp. 53-53.

Wenjun Jiang et al., “Towards 3D Human Pose Construction Using WiFi,” Proceedings of the 26th Annual International Conference on Mobile Computing and Networking, Sep. 21-25, 2020, pp. 1-14.

Manikanta Kotaru et al., “SpotFi: Decimeter Level Localization Using WiFi,” ACM SIGCOMM computer communication review, 2015, vol. 45, pp. 269-282.

Hanchuan Li et al., “ID-Match: A Hybrid Computer Vision and RFID System for Recognizing Individuals in Groups,” Proceedings of the 2016 CHI Conference on Human Factors in Computing Systems, ACM, 2016, pp. 4933-4944.

Liu Liu et al., “Efficient Global 2D-3D Matching for Camera Localization in a Large-Scale 3D Map,” Proceedings of the IEEE International Conference on Computer Vision, 2017, pp. 2372-2381.

Yongsen Ma et al., “WiFi Sensing with Channel State Information: A Survey,” ACMComput. Surv., vol. 52, No. 3, Article 46, Publication date: Jun. 2019, 36 Pages.

Yongsen MA et al., “SignFi: Sign Language Recognition Using WiFi,” Proceedings of the ACM on Interactive, Mobile, Wearable and Ubiquitous Technologies, vol. 2, No. 1, Article 23. Publication date: Mar. 2018, 21 Pages.

Sirajum Munir et al., “Real-Time Fine Grained Occupancy Estimation using Depth Sensors on Arm Embedded Platforms,” 2017 IEEE Real-Time and Embedded Technology and Applications Symposium (RTAS), 12 Pages.

Dinh-Van Nguyen et al., “WiFi Fingerprinting Localization for Intelligent Vehicles in Car Park”, 2018 International Conference on Indoor Positioning and Indoor Navigation (IPIN), pp. 24-27.

Alejandro Blanco Pizarro et al., “Accurate Ubiquitous Localization with Off-the-Shelf IEEE 802.11ac Devices,” Proceedings of the 19th Annual International Conference on Mobile Systems, Applications, and Services, 2021, 14 Pages.

Inioluwa Deborah Raji et al., “About Face: A Survey of Facial Recognition Evaluation,” arXiv preprint arXiv:2102.00813, 2021, 11 Pages.

Ralph Schmidt, “Multiple Emitter Location and Signal Parameter—Estimation,” IEEE Transactions on Antennas and Propagation, Mar. 1986, vol. AP-34, No. 3, pp. 276-280.

Elahe Soltanaghaei et al., “Multipath Triangulation: Decimeter-level WiFi Localization and Orientation with a Single Unaided Receiver,” The 16th Annual International Conference on Mobile Systems, Applications, and Services, Jun. 10-15, 2018, Munich, Germany. ACM, New York, NY, USA, pp. 376-388.

Deepak Vasisht et al., “Decimeter-Level Localization with a Single WiFi Access Point,” 13th USENIX Symposium on Networked Systems Design and Implementation 2016 (NSDI ’16), pp. 165-178.

Chen Wang et al., “Robust Chinese Remainder Theorem Ranging Method Based on Dual-Frequency Measurements,” IEEE Transactions on Vehicular Technology, Oct. 2011, vol. 60, No. 8, pp. 4094-4099.

He Wang et al., “InSight: Recognizing Humans without Face Recognition”, ACM HotMobile’13, Feb. 26-27, 2013, 6 Pages.

Hongsong Wang et al., “Learning Content and Style: Joint Action Recognition and Person Identi cation from Human Skeletons,” Preprint submitted to Journal of Latex Templates Mar. 20, 2018, 35 Pages.

Ju Wang et al., “LiFS: Low Human-Effort, Device-Free Localization with Fine-Grained Subcarrier Information,” MobiCom ’16: Proceedings of the 22nd Annual International Conference on Mobile Computing and Networking: New York, Oct. 3-7, 2016, pp. 234-256.

Genta Indra Winata et al., “Onthe Effectiveness of Low-Rank Matrix Factorization for LSTMModelCompression,” arXiv:1908.09982v1 [cs.CL] Aug. 27, 2019, 10 Pages.

Dan Wu et al., “WiDir: Walking Direction Estimation Using Wireless Signals,” Ubicomp ’16, Sep. 12-16, 2016, Heidelberg, Germany, pp. 351-362.

Yaxiong Xie et al., “Precise Power Delay Profiling with Commodity Wi-Fi,” IEEE Transactions on Mobile Computing, 2018, vol. 18, No. 6, pp. 1342-1355.

Jie Xiong et al., “ArrayTrack: A Fine-Grained Indoor Location System,” 10th USENIX Symposium on Networked Systems Design and Implementation 2013 (NSDI ’13), pp. 71-84.

Hua Xue et al., “WiZoom: Accurate Multipath Profiling using Commodity WiFi Devices with Limited Bandwidth,” 2019 16th Annual IEEE International Conference on Sensing, Communication, and Networking (SECON), IEEE, 2019, 10 Pages.

Rui Zhang et al., Wifi sensing-based real-time bus tracking and arrival time prediction in urban environments. IEEE Sensors Journal, 2018, vol. 18, No. 11, pp. 4746-4760.

(56) References Cited

OTHER PUBLICATIONS

Michael H. Zhu et al., "To prune, or not to prune: exploring the efficacy of pruning for model compression," arXiv:1710.01878v2 [stat.ML] Nov. 13, 2017, 11 Pages.
Nguyen Dinh-Van et al., "Indoor Intelligent Vehicle localization using WiFi received signal strength indicator," IEEE MTT-S International Conference on Microwaves for Intelligent Mobility (ICMIM), 2017, pp. 33-36.
Mohamed Ibrahim et al., "Wi-Go: accurate and scalable vehicle positioning using WiFi fine timing measurement," Proceedings of the 18th International Conference on Mobile Systems, Applications, and Services, Jun. 2020, pp. 312-324.
David Fernandez Llorca et al., "Recognizing individuals in groups in outdoor environments combining stereo vision, rfid and ble," Cluster Computing, 2017, vol. 20, No. 1, pp. 769-779.
Dapeng Tao et al., "Deep Multi-View Feature Learning for Person Re-Identification," IEEE Transactions on Circuits and Systems for Video Technology, Oct. 2018, vol. 28, No. 10, pp. 2657-2666.

* cited by examiner

REMOTELY ACTIVATED MOBILE DEVICE BEACON

TECHNICAL FIELD

This disclosure relates generally to use of radio frequency (RF) signals to locate a target.

BACKGROUND

The increase in hailing services use along with autonomous and semi-autonomous vehicles has increased a reliance on shared mobility (e.g., Uber, Lyft). However, often drivers and riders or drivers and consumers (e.g., delivery vehicles) have difficulties finding each other in urban areas. These difficulties include GPS signals being blocked by buildings such as skyscrapers, attenuated in crowded environments (e.g., in stadiums, airports, bars), at night, and in bad weather. Due to the difficulty in locating each other, the experience may waste time, creates a bad user experience, and causes more wasted energy due to idle time of the vehicle while trying to locate its target.

SUMMARY

In one embodiment, a mobile device includes a long-range transceiver, a medium-range transceiver, and a controller. The controller is configured to receive, from the long-range transceiver, a medium-range ID associated with a remote medium-range transceiver, transmit, via the long-range transceiver, an ID, channel, and band of the medium-range transceiver, connect, via the medium-range transceiver, to a remote medium-range transceiver based on the medium-range ID, transmit, via the medium-range transceiver, a beacon of data packets at an interval.

In another embodiment, a method of operating a mobile device includes receiving, from a long-range transceiver of the mobile device, a medium-range ID associated with a remote medium-range transceiver, transmitting, via the long-range transceiver, an ID, channel, and band of a medium-range transceiver of the mobile device, and transmitting, via the medium-range transceiver, a beacon of data packets at an interval.

In another embodiment a mobile device includes a cellular transceiver, a Wi-Fi transceiver, and a controller. The controller is configured to receive, from the cellular transceiver, a Wi-Fi ID associated with a remote Wi-Fi transceiver, transmit, via the cellular transceiver, an ID, channel, and band of the Wi-Fi transceiver, and transmit, via the Wi-Fi transceiver, a beacon of data packets at an interval.

DETAILED DESCRIPTION

Figure 1:
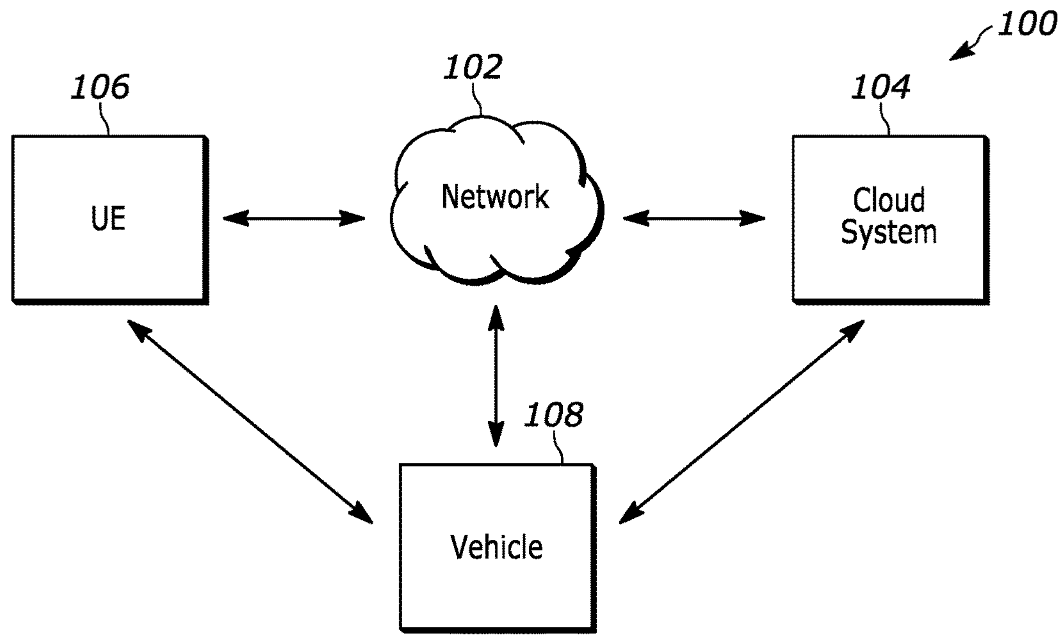
FIG. 1 is a block diagram of an exemplary configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Moreover, a network can also refer to an automotive network, such as, for example, a network where the nodes are vehicles (or autonomous vehicles), a network where the nodes are vehicles and the server is a remote computer in a cloud infrastructure, and the like. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example. A long-range transceiver include systems intended to be capable and practical in communication over a distance of greater than 100 meters, examples include satellite and cellular (analog, CDMA, TDMA, 2G, 3G, 4G, LTE, 5G, etc.), while a medium-range transceiver include systems designed to operate distances less than 100 m, examples include 802.11 Wi-Fi, Bluetooth, Ultra-wide band (UWB).

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user or mobile) device, referred to as user equipment (UE)), may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device (UE) may vary in terms of capabilities or features. The disclosed (and claimed) subject matter is intended to cover a wide range of potential variations, such as a web-enabled client device or previously mentioned devices that may include a high-resolution screen (RD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example. Moreover, the disclosed (and claimed) subject matter is also intended to cover devices that utilize, rely on and/or incorporate automotive electronic control units (ECUs), automotive gateways, vehicle computers, and/or any other type of known or to be known component that can part of an electronic vehicle (EV) and/or its operating system.

With reference to FIG. 1, system (or framework) 100 is depicted which includes UE 106 (e.g., a client device or mobile device), network 102, cloud system 104 and vehicle 108 (e.g., a vehicle with an embedded client device or embedded mobile device). UE 106 can be any type of device, such as, but not limited to, a mobile phone, tablet, laptop, personal computer, sensor, Internet of Things (IoT) device, autonomous machine, and any other device equipped with a cellular or wireless or wired transceiver. Further discussion of UE 106 and vehicle 108 is provided below at least in reference to FIG. 15.

Network 102 can be any type of network, such as, but not limited to, a wireless network, cellular network, the Internet, automotive network, and the like (as discussed above). As discussed herein, network 102 can facilitate connectivity of the components of system 100, as illustrated in FIG. 1.

Cloud system 104 can be any type of cloud operating platform and/or network based system upon which applications, operations, and/or other forms of network resources can be located. For example, system 104 can correspond to a service provider, network provider, vehicle security operations center (VSOC), content provider and/or medical provider from where services and/or applications can be accessed, sourced or executed from. In some embodiments, cloud system 104 can include a server(s) and/or a database of information which is accessible over network 102. In some embodiments, a database (not shown) of system 104 can store a dataset of data and metadata associated with local and/or network information related to a user(s) of UE 106, user(s) and the UE 106, and the services and applications provided by cloud system 104 and/or vehicle 108.

In some embodiments, cloud system 104 can include one or more CPUs constituting a TEE(s), and one or more GPUs for offloading, as discussed herein. The vehicle 108 can be in communication with the UE 106 via long-range communication (e.g., satellite or cellular) thru the cloud system 104 and network 102, or the vehicle 108 can communicate directly with the UE 106 over at least medium-range communication (e.g., 802.11 Wi-Fi, Bluetooth, Ultra-wide band (UWB).

With the increase demand for hailing services, people are increasingly relying on shared mobility drivers (e.g., Uber, Lyft) for transportation. However, often drivers and riders have difficulties finding each other in urban areas. These difficulties include GPS signals being blocked by buildings such as skyscrapers, attenuated in crowded environments (e.g., in stadiums, airports, bars), at night, and in bad weather. Due to the difficulty in locating each other, the experience may waste time, creates a bad user experience, and causes more $CO_2$ emission due to idling of a vehicle in the system. In this disclosure, the use of medium-range communication (e.g., Wi-Fi) is used to aid drivers, semi-autonomous, and autonomous vehicles in determining a street side of a potential rider or delivery. This system can be also known as CarFi that uses Wi-Fi channel state information (CSI) from multiple antennas (e.g., 2, 3, 4, etc.) coupled with a moving vehicle and a data-driven technique to determine the street side of the rider, hailer, target. This system was tested by collecting real-world data in realistic and challenging settings by blocking the signal with other object including people, parked cars, etc. Based on these tests, the systems and methods disclosed had a 95.44% accuracy in rider/target side determination in both line of sight (LoS) and non-line of sight (nLoS) conditions and can be run on a processor such as an embedded processor, or embedded GPU in real-time.

Currently, drivers and riders use smartphones, which rely on GPS or cellular signals, to locate each other while far apart, and require them to recognize each other while nearby. However, in urban cities and areas like downtown, arenas, and stadiums where there are numerous skyscrapers, GPS signals often do not work. In addition, there are places, e.g., airports, malls, hospitals, where the drivers need to come to a covered area, such as parking garage, to pick up riders where the building/parking structure blocks GPS signals. Also, it is challenging to locate the actual rider among many people in crowded environments like stadiums, airports, theatres, and bars. Moreover, the situation can worsen due to lack of visibility, e.g., at night and during bad weather (such as rain, storm, and snow). This issue wastes the time of the riders and drivers, causes more $CO_2$ emission due to idle driving, and causes frustration and creates a bad user experience.

Figure 2:
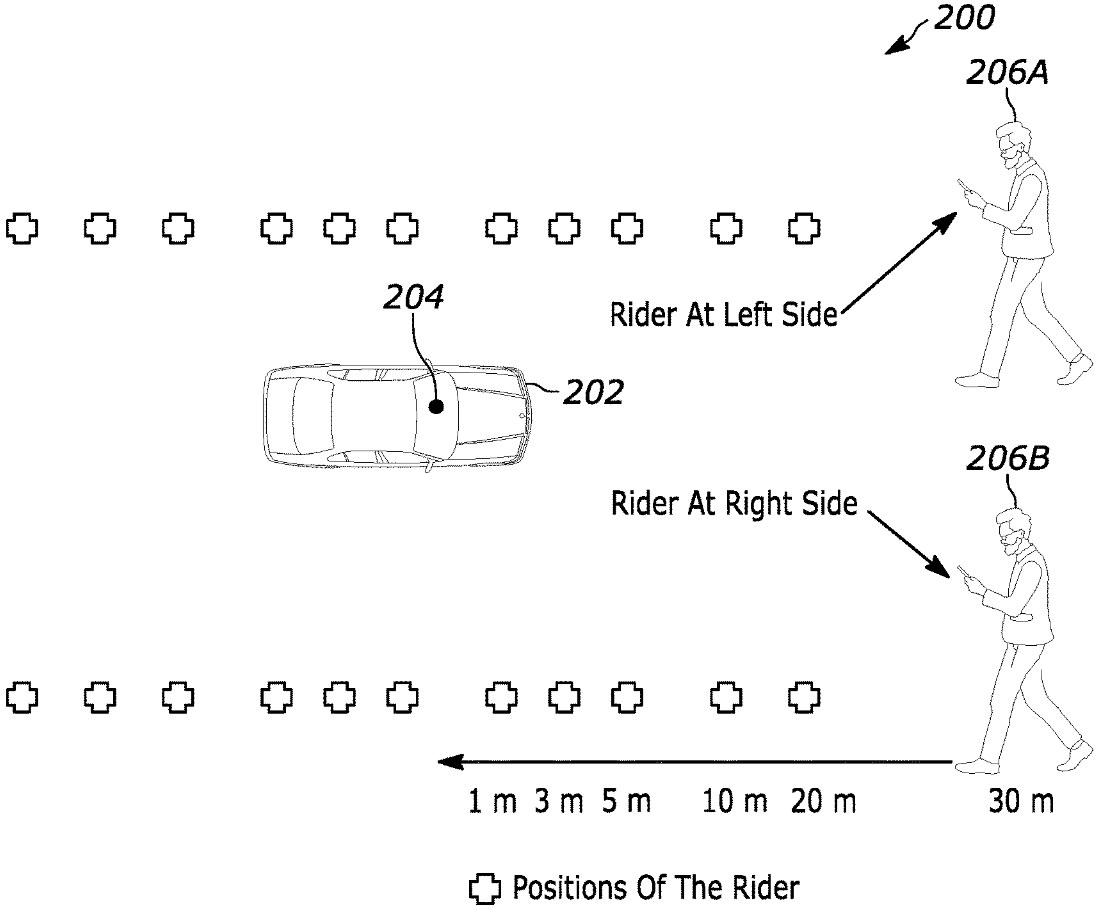
FIG. 2 is an illustration of a vehicle approaching a target rider.

A recent Uber study shows that users do not like to negotiate the pickup point, and most find it hard to give directions to the driver when the user is at a new place. Further, many find that determining the street side that the rider is on a very crucial component. This is because, in some downtown areas, the streets are multi-lane and single direction such that if the car is on the other side of the street, the rider may have to cross the street, which can be unsafe. See FIG. 2 which is an illustration of a roadway 200 with a vehicle 202 that includes an RF transceiver to communicate with a riders (targets) mobile phone 206A or 206B. Also, the drivers do not want to make a U-turn and realize that they were on the right side in the first place, which leads to requiring a second U-turn.

Several solutions have been proposed to improve the rider pick-up experience. For example, the vehicle can use a camera and facial recognition to identify the rider and subsequently compute the location. However, facial recognition requires the rider to upload his or her photo, which can be privacy-invasive. Moreover, for facial recognition to work, the rider needs to be within the camera's field of view and occupy enough pixels to be successfully recognized and have good lighting conditions. One can also ask the user to scan the surroundings with his or her phone, and then a server can perform 3D reconstruction and matching to the previous established real-world model to compute the exact location of the rider. However, this is a computation-intensive approach, and this method also requires the world to be digitized and constructed to allow such matching. As commercial products, Uber and Lyft have multicolored LED-based lights for riders to recognize their cars. However, such a solution does not work in broad daylight, and it is a rider-oriented solution, i.e., the rider has to find the car, and the driver does not have much information about the location/side of the rider.

In this disclosure, one embodiment was a Wi-Fi enabled smartphone and a vehicle based Wi-Fi system such as a Wi-Fi enabled dashcam that was used to determine the street side of a rider (or target or remote system). This system and method can be referred to as CarFi. CarFi neither requires the rider to upload any photos of themselves nor the photo of the surrounding area, which protects the rider's privacy, reduces the computation load, and does not depend on lighting conditions. CarFi uses Wi-Fi communications between the rider's smartphone and the vehicle based Wi-Fi system. The vehicle based Wi-Fi system can be implemented as a standalone devices that can be placed in or installed in any vehicle, or a vehicle that has Wi-Fi already installed.

CarFi uses a multiple antennae (e.g., 2 or 3 antennae that can be arranged in a geometric pattern such as a line, triangle, square, etc.) and a Wi-Fi chipset to receive the Wi-Fi packets sent by the smartphone held by the rider. This system does not require any modification to the vehicle or the smartphone. The Wi-Fi packets can be generated by a ride-hailing app, which can share the phone's MAC address (or, a randomized MAC address) through the cloud/server to the vehicle (or, driver's app). Thus, the vehicle can listen to the packets generated from the target phone. The system on the vehicle extracts the Channel State Information (CSI) data from the Wi-Fi chipset. After some preprocessing, it performs sub-carrier selection. Then, it extracts relevant features (amplitude difference between antennas, multipath profile, power delay profile) for rider side determination. Then, the contextual and motion-related features are encoded into a data-driven model (LSTM) to classify whether the rider is on the right or the left side of the vehicle. This system and method uses CSI amplitude, however it can also be implemented using CSI phase information that may be made more accurate by implementing phase calibration.

First, a comprehensive exploratory analysis was performed to understand the potential of using Wi-Fi CSI in an automotive environment for shared mobility applications. This empirical study involved determining the set of features that can effectively work in an automotive environment in both line of sight (LoS) and non-line of sight (nLoS) conditions when a vehicle is being driven and encoding the features into the design and implementation of a data-driven model (LSTM) for estimating the side of the rider using only two antennas and CSI amplitude. In general a CarFi system does not require privacy-invasive personal information from the rider such as a photo, and avoids heavy computation on the server, and works in the dark.

Second, was to set up an infrastructure to collect Wi-Fi CSI from a moving vehicle with a done-based system for annotating the ground truth location of the vehicle when each packet is received. A dataset collection of 85 rides with over 568,000 Wi-Fi packets in a realistic and challenging environment, considering both LoS and nLoS, where other people and other parked vehicles block Wi-Fi signals.

Third, based on evaluation using data collected from the real-world, the results show that CarFi is 95.44% accurate in classifying the rider side in both LoS and nLoS conditions. By also implementing several baseline solutions using phase difference and other features illustrated the performance of this solution. An evaluation of the execution time of this approach in both powerful and embedded GPUs was performed and it showed that this solution can be run on an embedded GPU in real-time.

Figure 3:
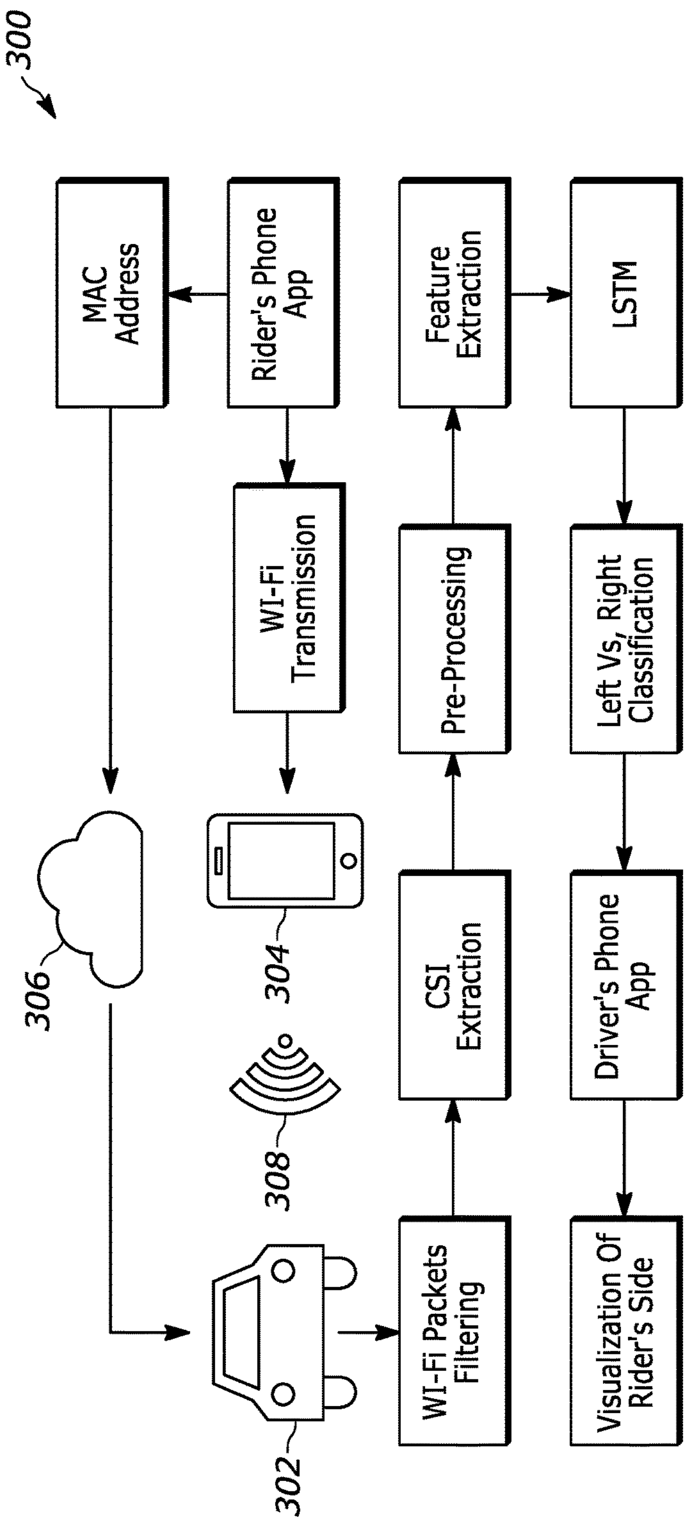
FIG. 3 is a flow diagram of various embodiments of the present disclosure.

An overview of the CarFi system 300 is shown in FIG. 3. When a rider 304 wants to travel to a specific location, s/he uses the ride-hailing phone app on the phone to book a trip. The cloud server 306 of the service providers processes the request and finds a driver. The locations of the vehicle 302 and the rider 304 are determined by their respective location providers, such as GPS on the phone. Once the trip is confirmed, the driver heads toward the rider's location. As the driver arrives within a certain distance, e.g., 0.5 miles from the rider based on the location data, the rider's phone will transmit Wi-Fi packets 308 at a higher transmission rate as the ride-hailing app controls it.

In the meantime, the phone's MAC address is shared with the dashcam via the servers in the cloud. A randomized temporary MAC address can be used to preserve the privacy of the rider. As the vehicle is also within this certain range, the dashcam starts listening for Wi-Fi packets containing the phone's MAC address and filters out other packets. When CarFi system receives the Wi-Fi packets with matched MAC address, it extracts the CSI information, performs some pre-processing, and calculates relevant features. Then it feeds the features to an LSTM, which estimates the street side of the rider. Then, this information is passed to the driver's smartphone app from the dashcam for visualization. The data exchange between the phone and the dashcam can be achieved via either Bluetooth or cellular connection (if the dashcam has it).

Challenges:

In this section, a discussion of the challenges that a CarFi system faced for rider side localization in an automotive environment.

A. Automotive Environment:

When moving Wi-Fi devices from indoor locations to automotive environments, the characteristics of the environment and its effects on the signals change dramatically. One of the biggest issues in an automotive environment is the metal structure of the vehicle body, which can be similar to a Faraday cage. Although the signal of normal radio frequency communication systems has a higher frequency than what the window can block due to its large size, the vehicle's metal surface can still block and redistribute the signal. Unfortunately, there has not been much work to understand how Wi-Fi CSI looks like inside of a vehicle when the vehicle is being driven.

With such a complex RF environment, the current state of-the-art method can not accurately estimate the Angle of Arrival (AoA) of the Wi-Fi signal. The X-axis represents the distance of the rider from the car. The car is coming from the left side of the X-axis, meets the rider in the center, and then leaves. The three antenna arrays are coupled with the vehicle (e.g., at the center of the dashboard of the car), and the AoA should be 0 to −90° (0 to 90°) when the rider is at the right (left) side. Consider two cases: the rider is standing without anyone blocking the signal, and two other cars and three other people blocking the signal. In which the rider was on the right side in both cases. In the LoS cases, the AoA is relatively stable as the Wi-Fi signal penetrates through the front windshield, but when the car leaves the rider, there is a lot of fluctuation of the AoA as the backside of the car blocks the signal. It was observed that when other people and cars block the rider, the AoA is unreliable even when the rider is in front of the car. Since AoA estimation also requires three antennas and phase calibration, we do not use AoA in our approach.

B. Speed and Time:

It is not expected that the vehicle will approach the rider at highway speed when they are nearby. Instead, it is assumed that the vehicle will be traveling at a lower speed to be able to stop quickly. Therefore, consider 10 to 20 miles per hour vehicle speed, which translates to 4.47 to 8.94 meters per second. Also consider the transmission range of the Wi-Fi signal to be around 70 to 120 meters in the outdoor environment. If the rider is 70 meters in front of the car, the driver has about 7.83 to 15.66 seconds to stop the vehicle. Given the human response time is about 1 to 1.5 seconds, it was determined that the if CarFi system takes 3 seconds, it will provide adequate time for the driver to respond and stop safely. Smartphones can transmit several hundreds of Wi-Fi packets in a second. However, there could be a burst of packet loss due to nonline of sight (nLoS). In addition, the more time taken to make a decision, the higher accuracy can be offered. Thus, a small window size with a variable number of received packets poses a difficult challenge for rider side determination.

C. Cost:

In order to make the solution practical, we need to use inexpensive antennas and a lightweight computing platform. A simpler solution might use two directional antennas to classify left vs. right. However, the need for directional antennas with 180-degree horizontal beamwidth, which is expensive. For example, an average costs is $225 per antenna. Cheaper ones have a smaller beamwidth. For example, one brand costs $35.94 per antenna, but has only 66 degrees horizontal beam patterns. Also, such directional antennas are bulky and could obstruct the field of view of the driver more. Adding more antennas also helps in improving the accuracy but also increases the cost of the Wi-Fi chipset and antenna chain. Moreover, the solution needs to be lightweight to be able to run on an embedded GPU or accelerators. Although, such an accelerator would increase hardware cost, a dashcam with such capability could provide additional benefits to the drivers by offering additional services e.g., detecting accidents, violence/aggression in the car and providing necessary support by performing audio-visual analysis.

Figure 4:
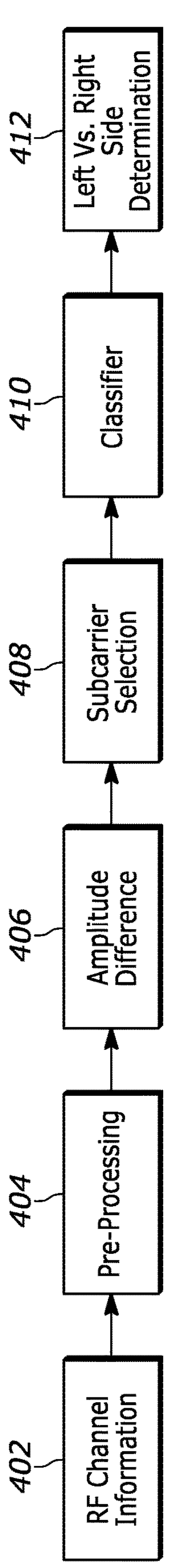
FIG. 4 is a flow diagram of an amplitude-based target side of the road determination.

Approach:

FIG. 4 is a flow diagram 400 of an amplitude-based target side of the road determination. The RF Channel information 402 is extracted from the RF signal and then pre-processed 404 before being fed to an amplitude difference being determined in block 406. After sub carrier selection is performed in block 408 followed by classification 410 and lastly the output 412 is used to determine if the target or remote device is on the left or right side of the vehicle.

A. Pre-Processing

When the receiving unit starts to receive Wi-Fi packets, CarFi timestamps each packet and kept all the packets within a window size of 3 seconds for processing together. Then, it uses a stride length of 0.4 seconds to create the next window. The window size and stride length can be greater or smaller than the times used.

B. Feature Selection

In this section, a discussion of the set of features that were used for left vs. right classification.

1) Amplitude difference: The use of Channel State Information (CSI) from only two antennas for the classification was used, however multiple antennas can be used. Consider a distance between the antennas being d. In one exploratory analysis, d=5.2 cm, with the CSI containing how the RF signal propagates through the environment as they are being affected during transmission. The CSI data collected at the receiver side contains those affected and encoded in the complex form with amplitude and phase information. Each CSI data point is also the Channel Frequency Response (CFR):

$$H(f;t)=\sum_{n}^{N}a_n(t)e^{-j2\pi f\tau_n(t)} \tag{1}$$

Where $a_i(t)$ is the amplitude attenuation factor, $\tau_i(t)$ is the propagation delay, and f is the carrier frequency.

A plot of CSI amplitude difference between antenna C and antenna A looks like for a portion of a ride for 30 sub-carriers, the X-axis showed the distance of the car with respect to the rider. As the car is approaching from the left side of the X-axis, meets the rider at the middle of the X-axis, and then passes the rider after that. When plotting amplitude difference, plot the CSI amplitude of the antenna C-antenna A, where antenna A, B, and C are placed from left to right parallel to the dashboard. So, a positive value is a good indicator that the rider is on the right side. Note that the amplitude difference values fluctuate over time, and they also vary for different sub-carriers. As the CSI amplitude varies by subcarriers, instead of relying on all the sub-carriers, consider determining the relevant sub-carriers that are less prone to noise.)

2) Sub-carrier selection: Instead of relying on all the sub-carriers, we select sub-carriers that are more resilient to noise. First, we compute the covariance of CSI amplitude of all the subcarriers of antenna C. High covariance between these subcarriers shows they receive effective signal and not the noise. For each subcarrier in antenna C, select the corresponding subcarrier of antenna A. These subcarriers have similar path properties (e.g., multipath effect, attenuation) and receive correlated CSI data. Vary the number of selected subcarriers from 1 to 30 and choose the number of subcarriers that provide the highest accuracy. Please note that sub-carriers are selected per window of packets. So, different windows may have different sets of sub-carriers. This approach is a Variance-based Sub-carrier Selection (VbSS). When choosing N subcarriers, consider N−1 sub-carriers using VbSS and add the first subcarrier.

C. Multipath Profile

Since Wi-Fi CSI data contains multipath attenuation caused by the environment, the multipath profile extracted from the CSI data can be very useful in location estimation. It can effectively provide whether the rider is in LoS or nLoS conditions. To extract the multipath profile of the CSI data, explore how MUSIC and SpotFi algorithms extract signals and estimate their Angle of Arrival. Inspired by Eigen decomposition of matrix $XX^H$, where X is the CSI measurement, and $X^H$ is the conjugate transpose of X. The eigenvectors and eigenvalues can be used as features as they are affected by the environment and the vehicle. Taking the top two dominant multipaths and plotting them with both LoS and nLoS conditions, in which the X-axis in both figures shows the distance from the car as the car is approaching the rider from the left side of the axis. There was a significant difference between the first and the second multipath. However, as the car leaves the rider, the backside of the car blocks the signal and causes nLoS conditions, and hence the difference between the top two multipaths decreases significantly.

D. Power Delay Profile

Power Delay Profile (PDP) describes the power level associated with each multipath along with the propagation delays. However, due to the limited bandwidth of the Wi-Fi channels, the path length resolution is not very precise. For our 802.11ac 40 MHz channel, the path length resolution is 7.5 m. But it can be helpful for coarse-grained mobility tracking over time and provide contextual information regarding LoS and nLoS.

When the Wi-Fi chipset measures the channel frequency response as written in equation 1, instead of measuring continuously, it samples the response at discrete frequency points $f=f_0+k\Delta g$ where k is the sub-carrier index and $\Delta f=312.5$ kHz [33]. Since Equation 1 is in the frequency domain, by applying Inverse Fourier Transform, we can get the response in the time domain which is also the Channel Impulse Response (CIR):

$$f(t) = \sum_{n}^{N} a_n \delta(t - \tau_t) \tag{2}$$

where $a_n$ and N is the same as in Equation 1 and $\delta(\bullet)$ is the delta function. By calculating the norm $\|f(t)\mu_2$ of the Channel Impulse Response f(t), we can get the Power Delay Profile. Each of the signal samples in the Channel Impulse Response correlates to different multipath as their time to travel from the transmitter to the receiver differs due to differences in the traveled length. By considering the IFFT theory, the time resolution $\Delta\tau$ is related to the sampling resolution $\Delta f$ mentioned above. While increasing the number of bins in IFFT, the actual resolution does not change. As such, set the IFFT bins to the number of subcarriers, which is also the frequency sampling resolution. For collected data, 30 subcarriers were reported for each antenna. By using two antennas, 60 PDP values were obtained as features per Wi-Fi packet. Next show the PDP values from one antenna in LoS condition, and in nLoS condition, where there are three people and two cars blocking the signal between the rider and his car. In both cases, the rider was on the right side. We see how the PDP values are changing as the car approaches the rider from the left side of the X-axis and passes him. The PDP values do not necessarily tell if the rider is on the left or right side but help contextualize the packets of similar distance, and in LoS/nLoS conditions to provide additional information to the classification model.

Classification

Consider different classifiers to classify the side of the rider (left vs. right), including k-Nearest Neighbor (kNN), Decision Tree (DT), and Support Vector Machine (SVM). In addition, we design a Long Short-Term Memory (LSTM) neural network classifier by effectively integrating all the features. Now, we describe the design of an LSTM and how we encode the relevant contextual and motion-related features. As the vehicle approaches the rider, the motion of the vehicle, as well as the distance between the transmitter (the phone held by the rider) and the receiver (Wi-Fi receiver on the vehicle), provides additional features in the time domain. For example, Wi-Fi signal differences between different antennas can vary across time. There are also Wi-Fi signal differences on the same antenna with different transmitter and receiver distances. Unlike neural network architectures such as FullyConnected Neural Network and Convolutional Neural Network (CNN), LSTM can better encode time series data with its feedback connections to remember values over arbitrary time intervals. Thus it can exploit the temporal features introduced by the vehicle's motion. While traditional classifiers like kNN, DT, and SVM can capture features at a single time step, they lack the ability to take into account the temporal features as the signal is coming from either left or right in both LoS and nLoS situations.

The general execution of LSTM is described in equations below:

$$\text{it} = \sigma(Wiixt + bii + Whiht - 1 + bhi) \tag{3}$$

$$\text{ft} = \sigma(Wifxt + bif + Whfht - 1 + bhf) \tag{4}$$

$$gt = \tanh(Wigxt + \text{big} + Whght - 1 + bhg) \tag{5}$$

$$ot = \sigma(Wioxt + \text{bio} + Whoh(t-1) + bho) \tag{6}$$

$$ct = \text{ft} \odot ct - 1 + \text{it} \odot gt \tag{7}$$

$$h_t = o_t \odot \tanh(c_t) \tag{8}$$

The main advantage of LSTM to other neural networks in temporal feature understanding is the memory cell $c_t$, which is used to accumulate state information in each time step. To decide what to remember and forgot, equation 3 and 4 calculate the input gate and forget gate value respectively. The input gate $i_t$ decides which information (which is calculated by Equation 5) is saved to the memory cell. On the other hand, the forget gate $f_t$ control which part of the previous cell status could be forgotten. With these calculations, we determine what is the new memory cell status through equation 7. Additionally, how the memory cell $c_t$ propagates to the final state or output $h_t$ (through equation 8) is controlled by the output gate $o_t$ (calculated at equation 6). This design allows the LSTM to take into account of previous state information and can be self-learned through the training process. In these equations, itis the data at time step t, b is the bias in each network connection, the upper case $W_i$ and $W_h$ represents the matrices of the weight of the input data and recurrent connection, respectively, and $\odot$ is the Hadamard product.

Figure 5:
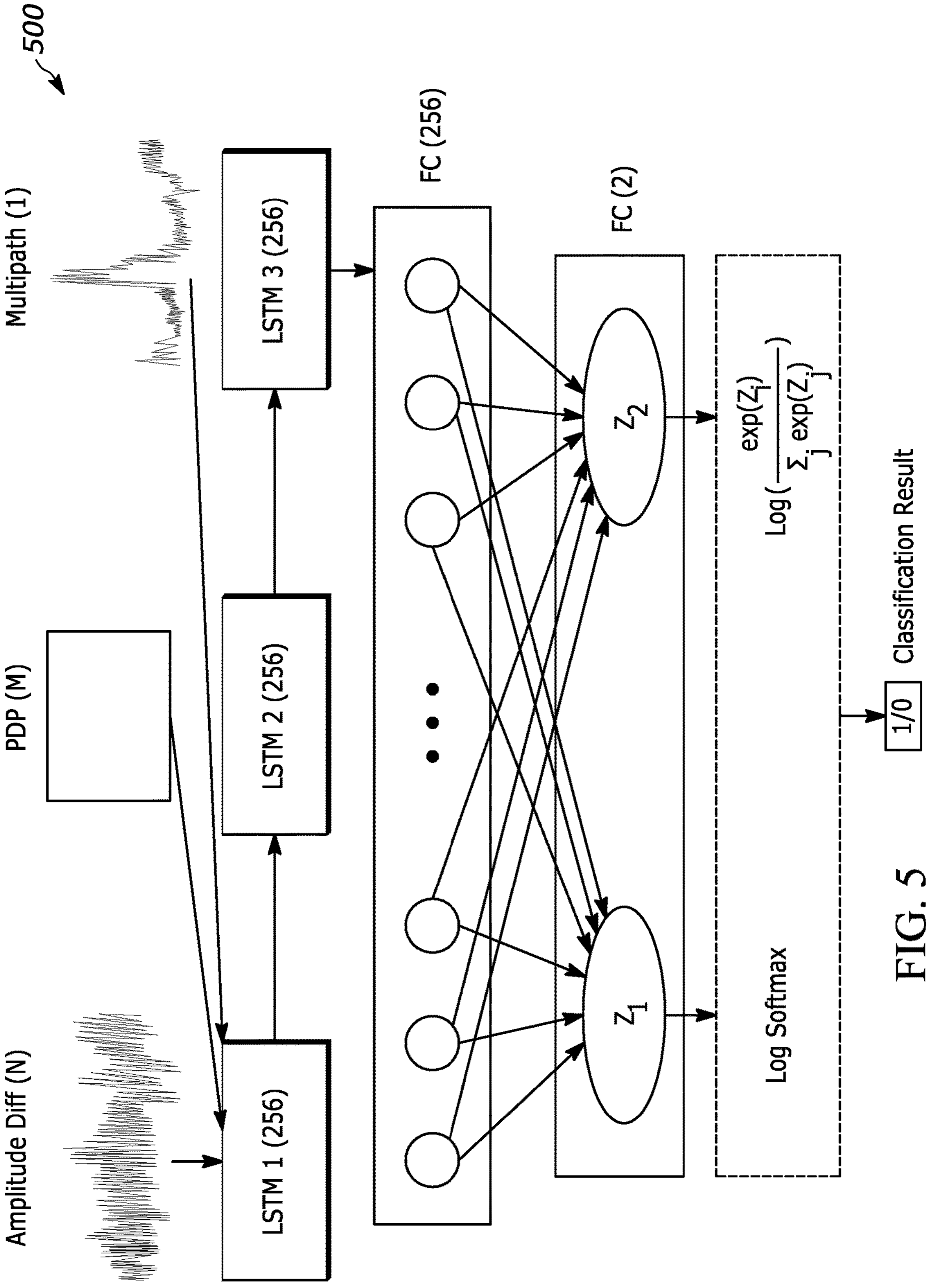
FIG. 5 is a flow diagram of a LSTM based binary classifier.

The architecture of LSTM 500 is shown in FIG. 5. This non-limited embodiment had an input size of N. 3 LSTM layers are stacked with 256 hidden units. They are followed by a linear layer with an input size of 256 and an output size of 2. A Softmax layer is added after the linear layer. The training uses a cyclic learning rate with a 5e-4 initial learning rate with maximum epochs of 650 with the patience of 200. For loss function, we use cross-entropy loss. We have a dropout of 0.5 in the LSTM layers.

The sequence length in LSTM for each sample (or, a window) needs to be the same. However, we observe burst of packet losses in nLoS conditions. As a result, the number of packets varies from windows to windows (in 3 seconds). Hence, the length of the LSTM sequence needs to be determined. We take the median of the number of packets of the windows of the training set, which is 855 packets and set that the sequence length of LSTM. If there are more packets, then we ignore the rest. If there are fewer packets, then we perform zero padding at the end of the sequence. In this way, we actually take 1.5 seconds of Wi-Fi packets half of the time for the classification.

Before feeding the CSI amplitude difference, power delay profile, and multipath profile features to LSTM, we normalize them. This is important to make sure different features with different scales (especially the dominant multipath) do not force the network to weigh differently. So, the features from the multipath profile and power delay profile need to be crafted in a way that even after normalization, the distinction of LoS and nLoS does not disappear. In order to ensure that, we create just one feature using the multipath profile by dividing the magnitude of the dominant multipath with that of the less dominant multipath. For the power delay profile, adding 60 input channels to LSTM may cause over-fitting. So, applying Principal Component Analysis of the 60 PDP features and take the top M principal components to feed to the network. Then vary M from 3 to 5 and show the results in the Evaluation section. After this process, the normalization retains the LoS and nLoS distinction and reduces the number of input channels to LSTM to reduce overfitting.

TABLE I

Distribution of 85 rides under different conditions.

| | Rider left side | Rider ride side |
|---|---|---|
| Only Rider | 7 | 6 |
| People both sides of the rider (no car) | 5 | 6 |
| Two other people blocking signal | 13 | 14 |
| Two cars blocking signal (no other people) | 10 | 12 |
| Two cars and three other people blocking signal | 6 | 6 |

Data Collection

A. System Setup

To extract the Wi-Fi data in an automotive environment, a laptop with an Intel 5300 Wi-Fi Network Interface Card (NIC) was used. The Linux CSI tool was used to collect PHY layer CSI information from received Wi-Fi packets. The car is driven with this set up for receiving Wi-Fi packets about 10-20 miles per hour. The three antennas are placed in the dashboard and marked as A (leftmost), B (middle), and C (rightmost), when viewed from inside of the vehicle. Although data was collected with 3 antennas, only two antennas were used for this embodiment approach (antennas A and C). However more antennas can be utilized. On the rider side, the rider stood with a Pixel 2 XL phone that serves as an Access Point (AP) at 5 GHz to which the laptop is connected to. An Android app from the phone generates Wi-Fi traffic by pinging the laptop that was developed and can achieve a packet transmission rate of up to 350 packets per second.

B. Collected Dataset

In order to consider realistic scenarios with LoS and nLoS conditions, we collect data of 85 rides under five different conditions: (a) only rider standing, (b) people standing on both sides of the rider, (c) two other people blocking the signal, (d) two other parked cars blocking the signal, and (e) two other cars and three other people blocking the signal. We collect data when the rider is on the left and right sides of the car in all these conditions. Table I shows the number of rides under different conditions.

The dataset was split into three sections: training (60%), validation (20%), and testing (20%). This was done for each condition and for each side of the rider. For example, when the rider is at the left side and two cars blocking the signal, consider 10 such rides. We take CSI data of 6, 2, and 2 rides for training, validation, and testing, respectively. In that way, the test set has data of disjoint rides and under all conditions. For each ride, split the sequence of CSI values into a 3 seconds window with 0.4 seconds stride length. This gives us 1032 windows for training, 286 windows for validation, and 285 windows for testing.

C. Ground Truth Collection

In order to collect the ground truth of whether the rider is at the left or right side of the car, one can just record the timestamps of received packets for each side of the rider.

However, we would like to collect the (x,y) location of the car when each packet was received to have a better understanding of how the CSI changes when the vehicle approaches the rider and leaves the rider at each side. In order to achieve this goal, we use an off-the-shelf consumer drone hovering above the data collection site to record the process. Before the data collection, we first determine landmark locations (e.g., the rider's location) and four positions that can form a rectangle area with tape-measured ground truth coordinates. Next, we place solid red-colored papers at each location and on top of the car to enable simple color-based pixel tracking through color thresholding. In the recorded video, we use the four locations to perform Homography transformation so that the pixel plane and real-world plane are parallel. This transformation creates a straightforward translation from the pixel coordination system to the real-world coordination system through scaling. Then we can track the vehicle in the pixel domain and interpolate the real-world (x,y) location through the translation. Prior to each data collection, we also time-synchronize the Android phone, the laptop with the Intel Wi-Fi chipset, and the drone. The time-synchronization between the phone and drone is achieved by capturing the phone's time with millisecond accuracy at the beginning of each drone's video; thus, we can calculate the timestamp based on the frame rate and a reference frame that has the phone's time clearly recorded. We also capture a screenshot with both the phone's time (through the laptop's camera) and the laptop's time displayed with millisecond accuracy; thus, the time difference between them can be easily calculated. We apply these time offsets to change the timestamp recorded on the laptop and the drone to match the time on the phone for time synchronization.

Evaluation

The accuracy of CarFi system was estimated and compared with state-of-the-art methods. Along with an investigation into the effect of antenna spacing, subcarrier selection, and window size on the performance of the solution. Also, estimating its execution time, and range in both LoS and nLoS conditions.

A. Accuracy

This Wi-Fi-based rider side determination technique implemented a few baseline methods to compare with our approach in terms of accuracy.

Baseline 1: CSI phase difference based approach: Although our approach does not require phase calibration, in order to investigate and compare with a phase difference based approach, perform phase calibration of the antenna chains with the Intel 5300 chipset attached with the laptop. Another laptop with Intel 5300 chipset was used to transmit Wi-Fi packets through an RF splitter, where all CarFi three receiver antennas are connected to the RF splitter's output. These three antennas should receive the Wi-Fi signal at the same time. However, due to the slight path distance difference within the RF splitter, we switch the receiver antennas' connecting locations and record the phase information in each connection combination to eliminate the difference introduced by the RF splitter. By removing the offset we measured, we correct the antenna phase offset in our collected data. The system also introduces Sampling Time Offset (STO) and Sampling Frequency Offset (SFO) as the sampling clocks and frequencies are unsynchronized between the receiver and the transmitter. Then remove STO and SFO through multiple linear regression.

Using only antennas A and C, and estimate the phase difference by subtracting unwrapped phase A from unwrapped phase C of each window. Ideally, the phase difference should be positive (negative) when the rider is on the left (right) side. But for 30 different sub-carriers, the patterns vary significantly. As an example, we show the phase difference when the rider is at the right side in LoS condition.

Since the unwrapped phase difference change over time, consider four different ways to compute the features to capture phase difference between antennas:

(a) Average all phase differences of all sub-carriers of all packets within a window. The intuition is that mean of phase difference should be different for different sides.

(b) Similar to (a), but instead of all the sub-carriers, just use the first sub-carrier.

(c) Divide the window into a few sub-windows. The reason for sub-windowing is to reduce the propagation error of phase unwrapping. Then, average all phase differences of all sub-carriers in each sub-window. Remove 20% sub-windows with large variance. Then, compute a positive or negative vote for each sub-window based on the sign of its phase difference. Count the numbers of positive and negative votes, and use them as features. We plot the number of positive and negative votes for all the 1032 training windows and plot them in FIGS. 11A and 11B.

Figure 11A:
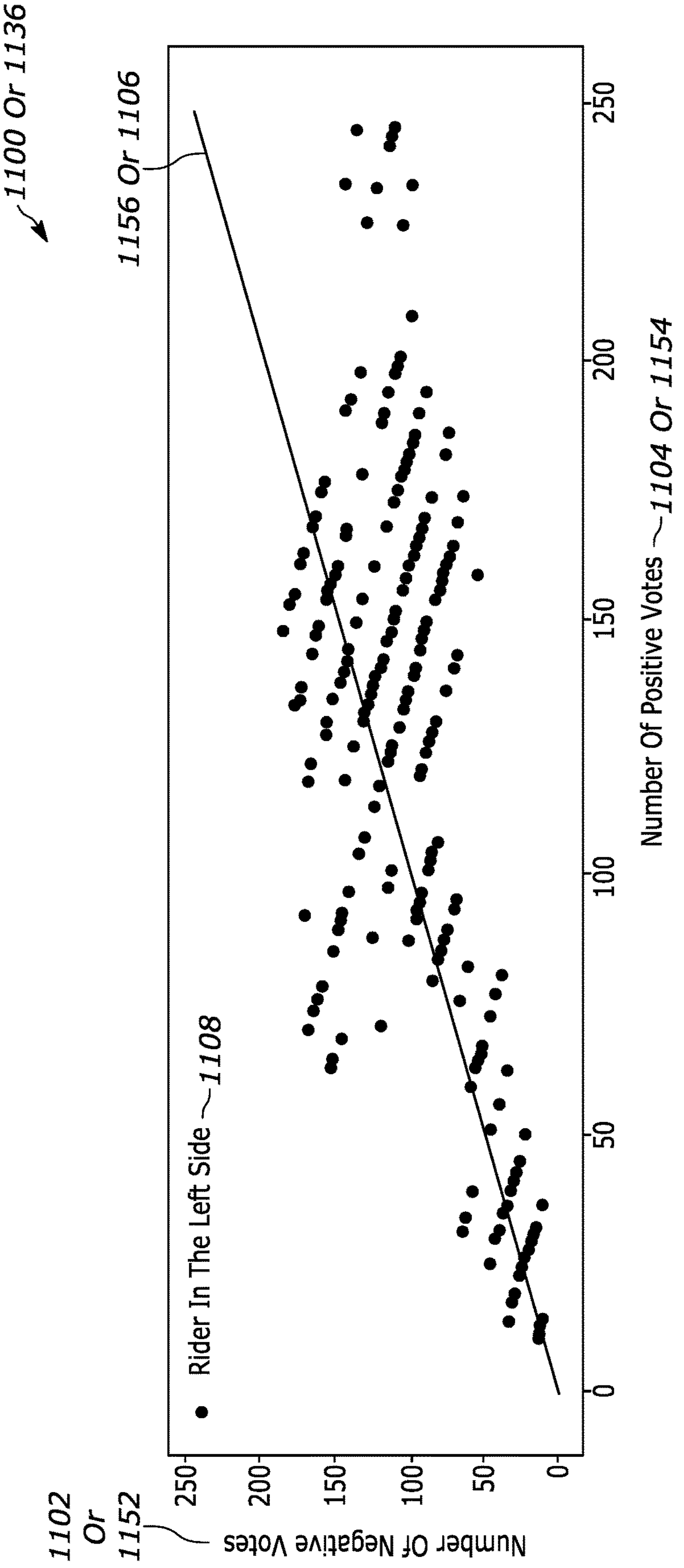
FIG. 11A is a graphical representation of Positive and negative votes of unwrapped phase difference between antennas when the rider is on the left side.

FIG. 11A is a graphical representation 1100 of negative votes 1102 with respect to positive votes 1104 of unwrapped phase difference between antennas when the rider is on the left side. The green line shows when the positive 1104 and negative votes 1102 are the same. It shows that when the rider is on the left side, there are more positive votes. Calculate such votes for all the sub-carriers.

Figure 11B:
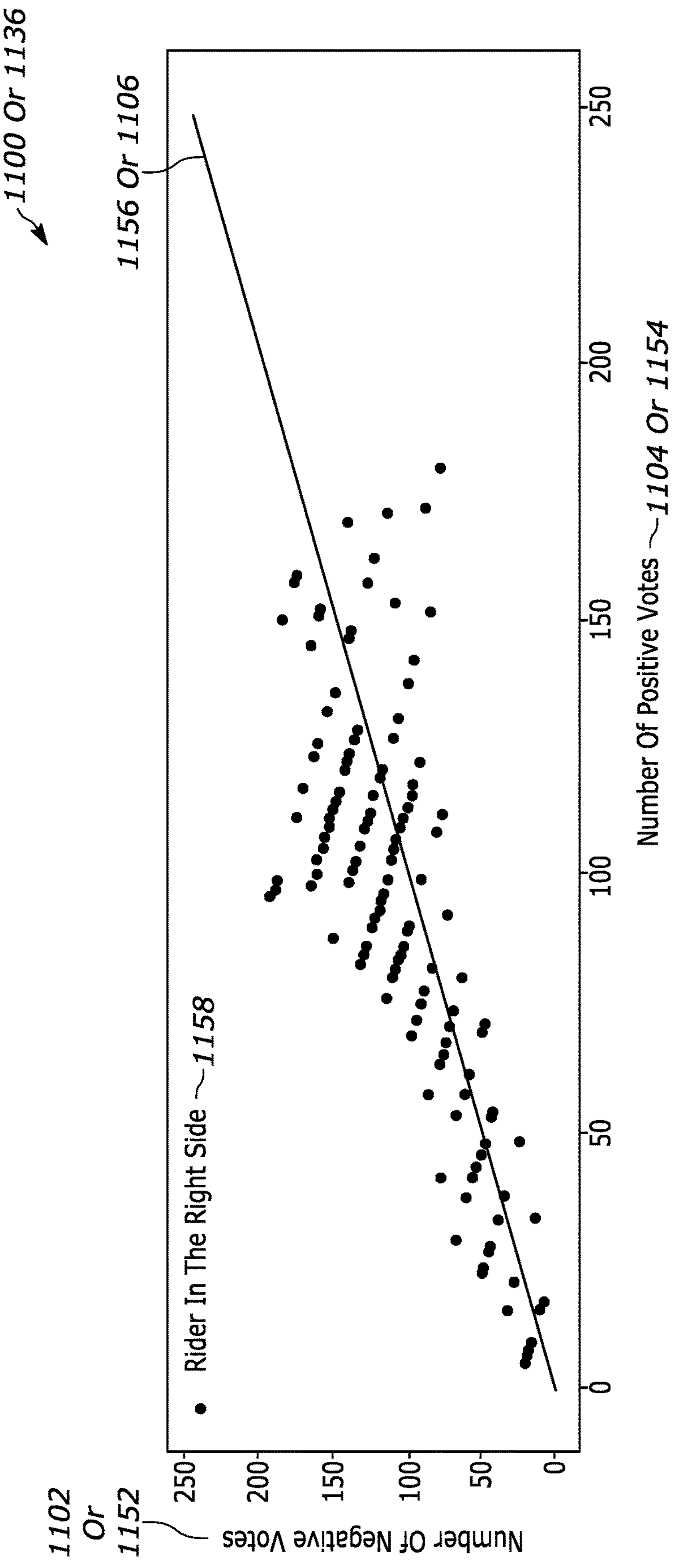
FIG. 11B is a graphical representation of Positive and negative votes of unwrapped phase difference between antennas when the rider is on the right side.

FIG. 11B is a graphical representation 1150 of negative votes 1152 with respect to positive votes 1154 of unwrapped phase difference between antennas when the rider is on the right side. The green line shows when the positive 1154 and negative votes 1152 are the same. It shows that when the rider is on the right side, there are more negative votes. Calculate such votes for all the sub-carriers.

Figure 12:
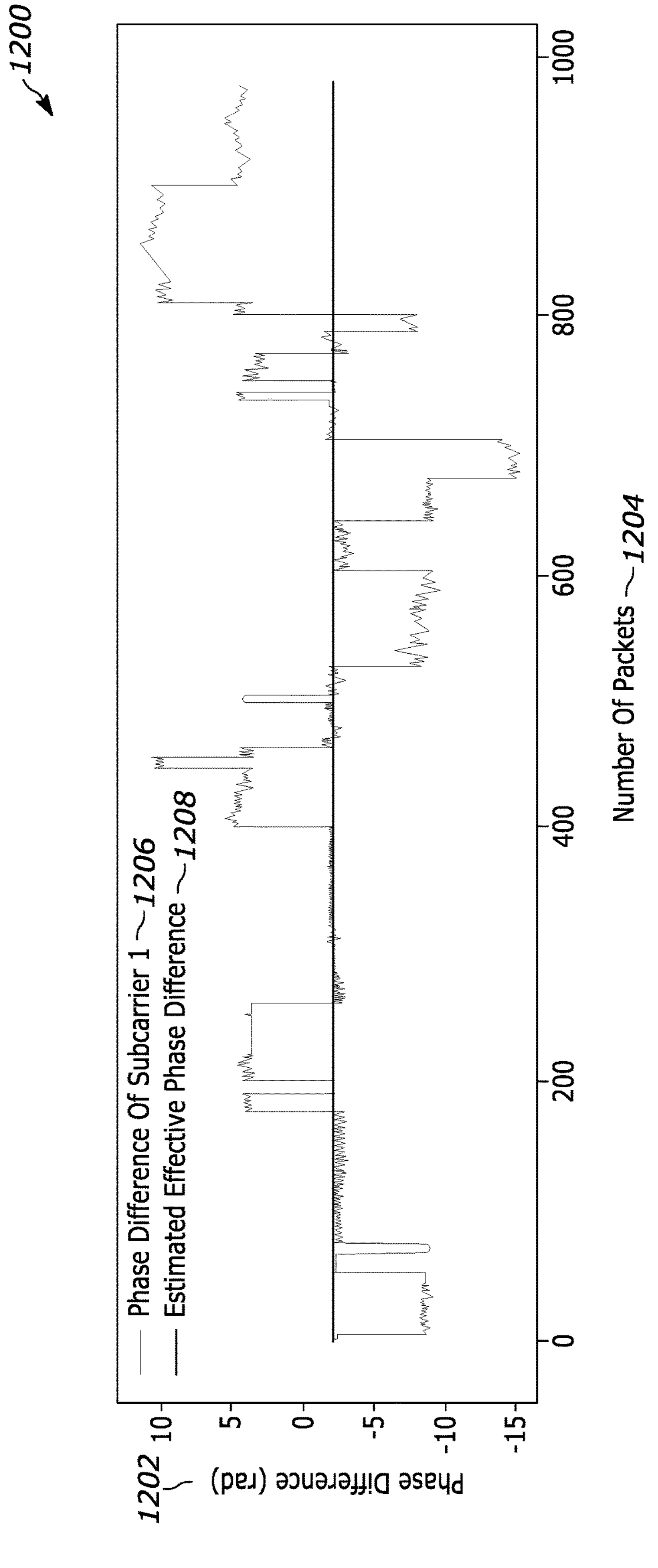
FIG. 12 is a graphical representation of estimating effective phase difference between antennas (C–A) when the rider is at the right side in LoS.

(d) After sub-windowing, compute an effective phase difference for each subcarrier. The intuition is that phase difference should be stable for each subcarrier because the central frequency is the same. Choose an effective phase difference that covers most phase differences within two radians and has the smallest mean error. An example of such an effective phase difference is shown in FIG. 12 when the rider is on the right side and in LoS condition. It shows that even though the phase difference fluctuates, the effective phase difference is negative (as it should be since the rider is on the right side). We estimate like this for 30 sub-carriers and use all 30 effective phase differences as features to the classifiers.

FIG. 12 is a graphical representation 1200 of phase difference 1202 with respect to number of packets 1204 illustrating a phase difference 1206 of subcarrier 1 when the rider is at the right side in LoS and an estimated effective phase difference between antennas (C–A) 1208.

Feed these features to kNN, DT, and SVM classifiers and show the results of rider side classification in Table II. For kNN, we vary the value of k from 3 to 15 and report the accuracy with the best k. It can be seen that the highest accuracy from the phase difference based approach is only 56%.

Baseline 2: RSS difference based approach: When we collect data, we also collect RSS (Received Signal Strength) values from each antenna. We feed the average RSS difference of antennas (C–A) of each window to different classifiers, including KNN, Decision tree, and SVM, to classify the rider side. The results are shown in Table II. The results show that the highest accuracy is 85.6% that came from both K-NN and SVM. It provides higher accuracy than the CSI phase difference based approach.

TABLE II

Results of left vs. right classification of baseline methods.

| Baseline | KNN (%) | DT(%) | SVM(%) |
|---|---|---|---|
| 1(a) | 50.2 (k = 5) | 46.0 | 48.4 |
| 1(b) | 54.4 (k = 11) | 50.2 | 44.2 |
| 1(c) | 52.6 (k = 3) | 52.6 | 51.6 |
| 1(d) | 52.6 (k = 3) | 56.0 | 49.5 |
| 2 | 85.6 (k = 10) | 76.1 | 85.6 |
| 3(a) | 84.2 (k = 5) | 81.1 | 84.6 |
| 3(b) | 88.1 (k = 3) | 83.9 | 87.7 |
| 3(c) | 83.5 (k = 7) | 81.4 | 85.3 |
| 3(d) | 87.3 (k = 8) | 82.5 | 89.5 |

Baseline 3: CSI Amplitude Difference Based Approach:

Since the CSI amplitude difference changes over time, we consider different ways to compute features to capture amplitude difference of antennas (C–A):

1). We average all CSI amplitude differences of all subcarriers of all packets within a window.

2). Similar to (a), but we use only the first sub-carrier.

3). Similar to (a), but we also add average RSS difference.

4). Similar to (b), but we also add average RSS difference.

We feed the features to kNN, DT, and SVM classifiers. The results are shown in Table II. Its shows the highest accuracy is 89.5%, when combining the average CSI amplitude difference and average RSS difference.

We also implement our LSTM based network and change network parameters, including the size of hidden dimensions and number of layers to see how that affects performance. The results are shown in Table III. It shows that when we use our variance based subcarrier selection, the accuracy is higher than when all sub-carriers are used, or only the first subcarrier is used. We see that we get 95.44% accuracy when we combine variance based subcarrier selection, power delay profile, and multipath profile. This highest accuracy came from when we select 14 subcarriers with VbSS, obtain 3 PDP features and 1 multipath profile feature. If we feed the exact same features to kNN, DT, and SVM, we get 68.4%, 69.5%, 84.2% accuracy, respectively. Hence, our LSTM based architecture increases accuracy by 11.24% from exactly the same input.

B. Sensitivity Analysis:

In this Section, we analyze the effect of antenna spacing, subcarrier selection, and window size on CarFi performance.

Effect of antenna spacing: In our analysis, the default antenna spacing was 5.2 cm, which produced 95.44% accuracy. Since we collected data with three antennas, we can use antenna A and B to see how the performance looks like when the antenna spacing is 2.6 cm. We keep the best performing network's parameter the same and run the experiment with 2.6 cm spacing and find the accuracy is only 55.79%.

Effect of window size: In our analysis, the default window size is 3 seconds. We keep the best performing network's parameter the same and run the experiment by varying window sizes to 1, 1.5, 2, 2.5, and 3 seconds find the accuracy is 62.95%, 79.36%, 80%, 85.17%, 89.03%, 95.44%, respectively. We see that longer windows provide higher accuracy.

Effect of number of sub-carriers: We keep the best performing network's parameter the same and run the experiment with changing the number of sub-carriers from 1 to 16 and show the impact of the number of sub-carriers through our VbSS method on accuracy in FIG. 9. When we choose only one subcarrier, we choose subcarrier 1, as it provides 89.47% accuracy. We achieve the highest accuracy (95.44%) when the number of sub-carriers is 14.

Figure 9:
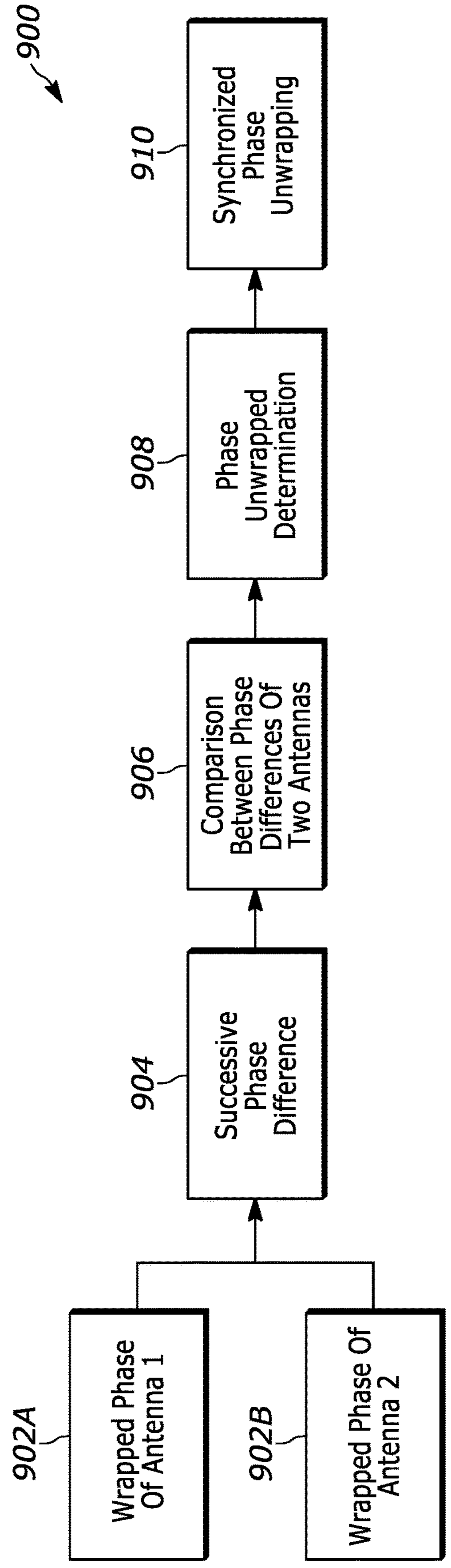
FIG. 9 is a flow diagram of synchronized phase unwrapping based target side of the road determination.

FIG. 9 is a flow diagram of synchronized phase unwrapping 900 based target side of the road determination. The phase of each antenna is unwrapped 902*a* and 902*b* and the phase difference is generated 904 followed by a comparison between phase differences of the two antenna 906 and phase unwrap determination 908 followed by synchronized phase unwrapping in 910.

is a plot of phase 1002 with respect to number of packets 1004 with two lines the first being unwrapped phase subcarrier 2 antenna 3 1006 and the second being unwrapped phase subcarrier 2 antenna 2 1008.

Generalizability: Although the data was collected from one large parking lot, we put an effort to introduce variation in the rides by asking the volunteers to stand differently to block the signal, move while blocking the signal, drive at different speeds, and vary the speed in different rides. As a result, there is a significant variation in the dataset, and we expect the model to generalize to some extent. One particular reason we were not able to collect data from a busy street is that the Wi-Fi of the laptop needed to stay connected to the phone for data collection with CSI Tool, which is very difficult to obtain in busy streets as the car can easily go out of the Wi-Fi range. Currently, we are switching to Nexmon framework for collecting CSI data, where the phone will inject packets at a particular Wi-Fi channel. This will allow us to perform a large-scale data collection from busy streets for testing the generalizability of the solution.

TABLE III

Results of left vs. right classification when LSTM with different features are used.

| Description | Input Dim | Hidden Dim | Number of layers | Optimizer | Accuracy |
|---|---|---|---|---|---|
| Variance-based Subcarrier Selection (VbSS) | 12 | 256 | 3 | RMSProp | 93.33% |
| Variance-based Subcarrier Selection (VbSS) | 12 | 256 | 3 | Adam | 91.57% |
| Variance-based Subcarrier Selection (VbSS) | 12 | 128 | 3 | RMSProp | 92.28% |
| Variance-based Subcarrier Selection (VbSS) | 12 | 256 | 4 | RMSProp | 89.82% |
| Variance-based Subcarrier Selection (VbSS) | 12 | 128 | 4 | RMSProp | 92.63% |
| First Subcarrier only | 1 | 256 | 3 | RMSProp | 89.47% |
| All sub-carriers | 30 | 256 | 3 | RMSProp | 89.47% |
| VbSS + Multipath Profile (MP) | 12 + 1 | 256 | 3 | RMSProp | 93.33% |
| VbSS + Power Delay Profile (PDP) | 12 + 5 | 256 | 3 | RMSProp | 93.33% |
| VbSS + Power Delay Profile (PDP) | 12 + 3 | 256 | 3 | RMSProp | 93.68% |
| VbSS + PDP + MP | 12 + 3 + 1 | 256 | 3 | RMSProp | 95.08% |
| VbSS + PDP + MP | 14 + 3 + 1 | 256 | 3 | RMSProp | 95.44% |

C. Execution Time:

We train our LSTM using Nvidia GeForce GTX 1080 Ti GPU. It takes about two hours to train the network. However, the inference is rapid. We estimate how long it takes to perform inference in a powerful GPU like NVidia GeForce GTX 1080 Ti as well as an embedded GPU like Nvidia Jetson Nano. It takes only 101.77 and 850.37 milliseconds to execute the inference process in 1080 Ti and Jetson Nano, respectively. Hence, the solution can be run on embedded GPUs in real-time. Also, there are several ways to optimize (e.g., recompiling with TensorRT can significantly reduce inference time on Jetson devices) and prune the model to compress the network, which will reduce inference time.

Figure 10:
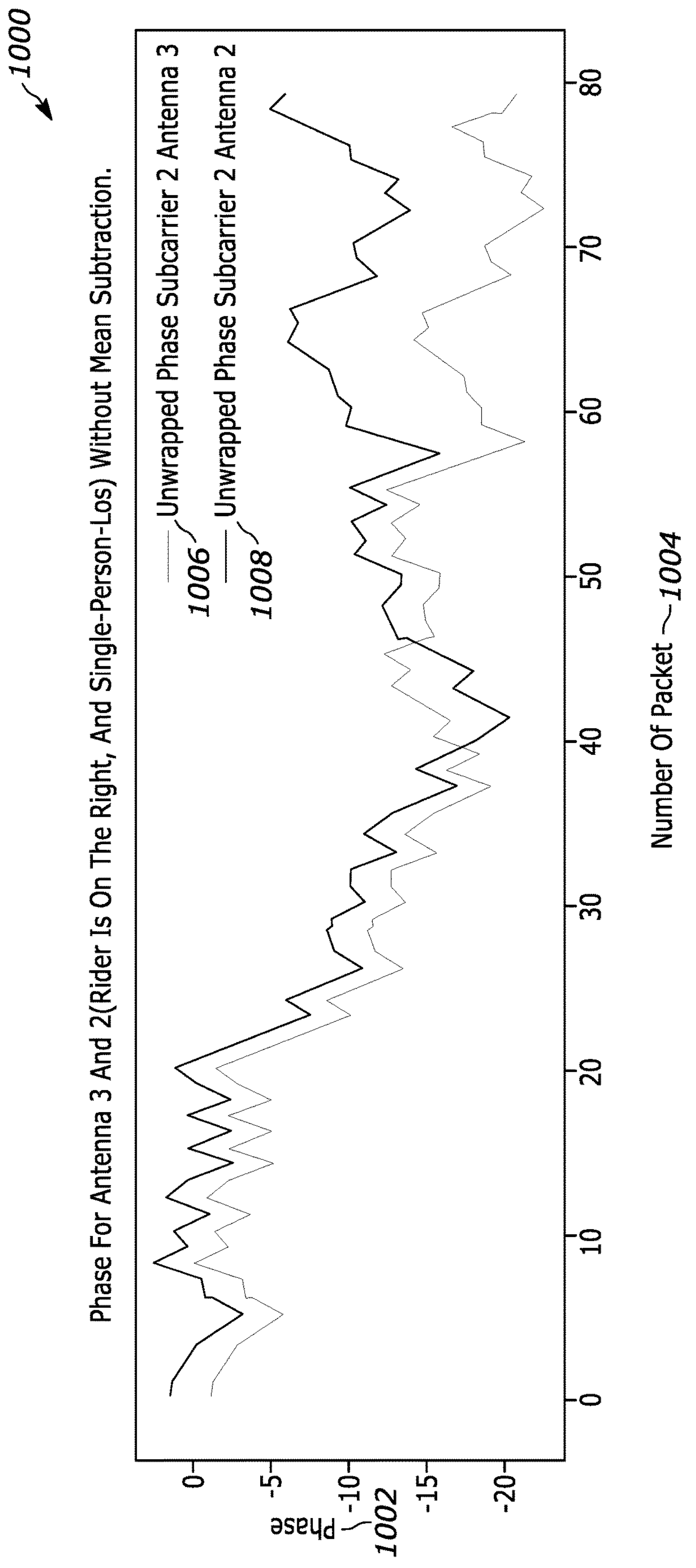
FIG. 10 is a graphical representation of unwrapped phase of two antennas when a target is at the right side.

D. Range Analysis:

In this section, we estimate how far CarFi can operate in both LoS and nLoS conditions. We collect additional data for this evaluation. We have a person standing at different distances ranging from 10 meters to 120 meters in front of the car in both LoS and nLoS conditions. We transmit 10,003 packets from each location. To create a nLoS condition, we have a person standing between the phone and Wi-Fi receiving unit placed in the car dashboard. The Packet Delivery Ratio (PDR) at different distances from the car is shown in FIG. 10. We see that even at a range of 120 meters, the PDR is 99.30% in LoS condition. However, in nLoS situation, the PDR drops sharply to 41.65% in 70 meters. At 120 meters, the PDR is only 0.75%. So, we see that in LoS conditions, CarFi will operate beyond 120 meters range.

FIG. 10 is a graphical representation of unwrapped phase of two antennas 1000 when a target is at the right side. This Focusing on Vehicle Side Determination.

Hardware set up: A smartphone with Wi-Fi chipset can be used to determine the street side of the riders. For example, a driver can place his smartphone in the dashboard of his/her car. Alternately, a dashcam with Wi-Fi chipset can also be used for this purpose. However, the Wi-Fi chipset needs to have at least two antennas to be used using the proposed technique. Having more than two antennas will also work. As mentioned before, a smartphone/dashcam with Bluetooth or Ultra-wide band chipset could also be used using the proposed technique. We call this device (smartphone/dashcam) that the driver uses as HardwareX.

Proposed Method: Rider Side Determination Using Wireless Signals

The following steps are taken to help drivers to determine if their riders are in left vs. right side of the street:

When the driver is at a predetermined distance to the rider (e.g., when they are within 0.5 mile radius) this can be detected by GPS signals with a ride hailing apps, etc.), two actions are taken: 1). The smartphone of the rider is configured to transmit Wi-Fi packets, 2). The HardwareX of the vehicle starts to receive incoming Wi-Fi signals Wi-Fi has a range of about 100 meters in outdoors. When the driver and the riders are within this range, one or more Wi-Fi packets generated by the smartphone of the rider are received by the HardwareX of the driver.

The MAC address of the rider's smartphone is shared with the HardwareX so that HardwareX knows which messages to listen (in other words, which messages are coming from the rider's phone). To ensure regulatory compliance, rider's approval is obtained before sharing the MAC address. Further, to protect security and privacy, a temporary MAC address can also be assigned to the rider which is used for creating these messages. MAC address can be generated in two ways: 1). The ride app provider creates temporary MAC address which it shares with both rider's phone and HardwareX. 2). The smartphone creates a temporary MAC address and informs the ride app which then informs the HardwareX.

When a Wi-Fi packet is received at the HardwareX, the associated Channel State Information (CSI) is extracted from the physical layer. It provides rich information about how a wireless signal propagates from the transmitter to a receiver and captures the combined effect of signal scattering, fading, and power decay with distance.

Figure 6A:
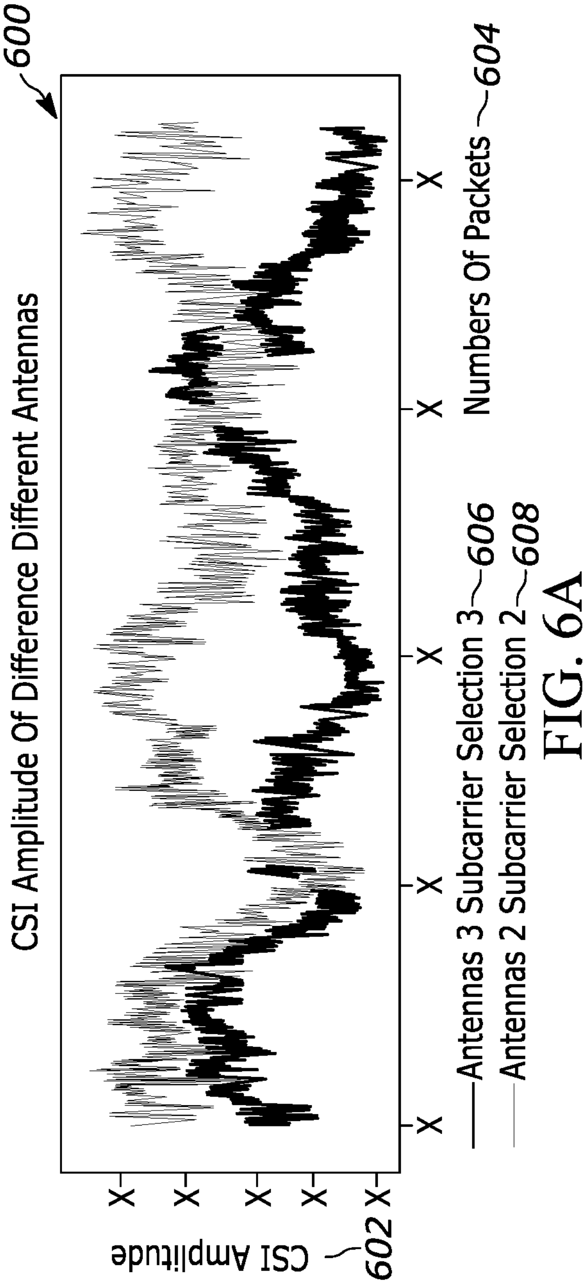
FIG. 6A is a graphical representation of amplitude of two antennas when a target is at the right side.

The CSI values are then used to determine the street side of the rider. We propose several methods for this purpose:

FIG. 6A is a graphical representation of amplitude 600 of two antennas when a target is at the right side. In this graph, CSI amplitude 602 is plotted with respect to number of packets 604 in which the two lines are antenna 1, subcarrier 1 606 and antenna 2 subcarrier 1 608

Figure 6B:
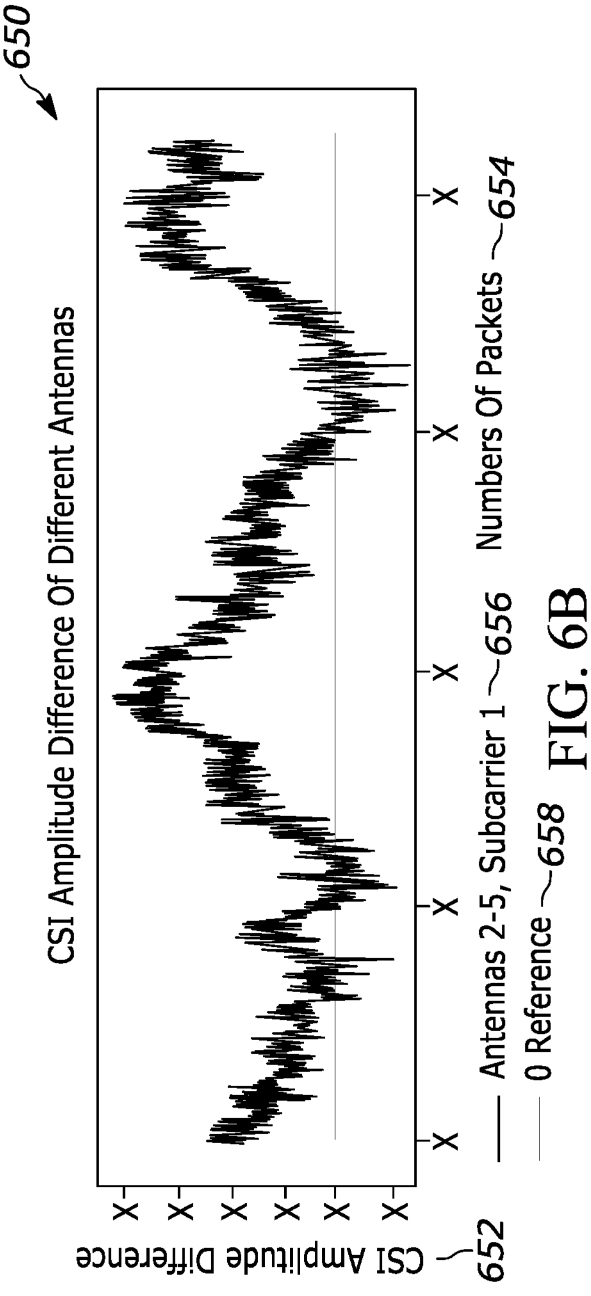
FIG. 6B is a graphical representation of amplitude difference between two antennas when a target is at the right side.

FIG. 6B is a graphical representation of amplitude difference 650 between two antennas when a target is at the right side. In this graph, CSI amplitude difference 652 is plotted with respect to number of packets 654 in which the two lines are amplitude difference 658 and a reference line 660

Figure 7A:
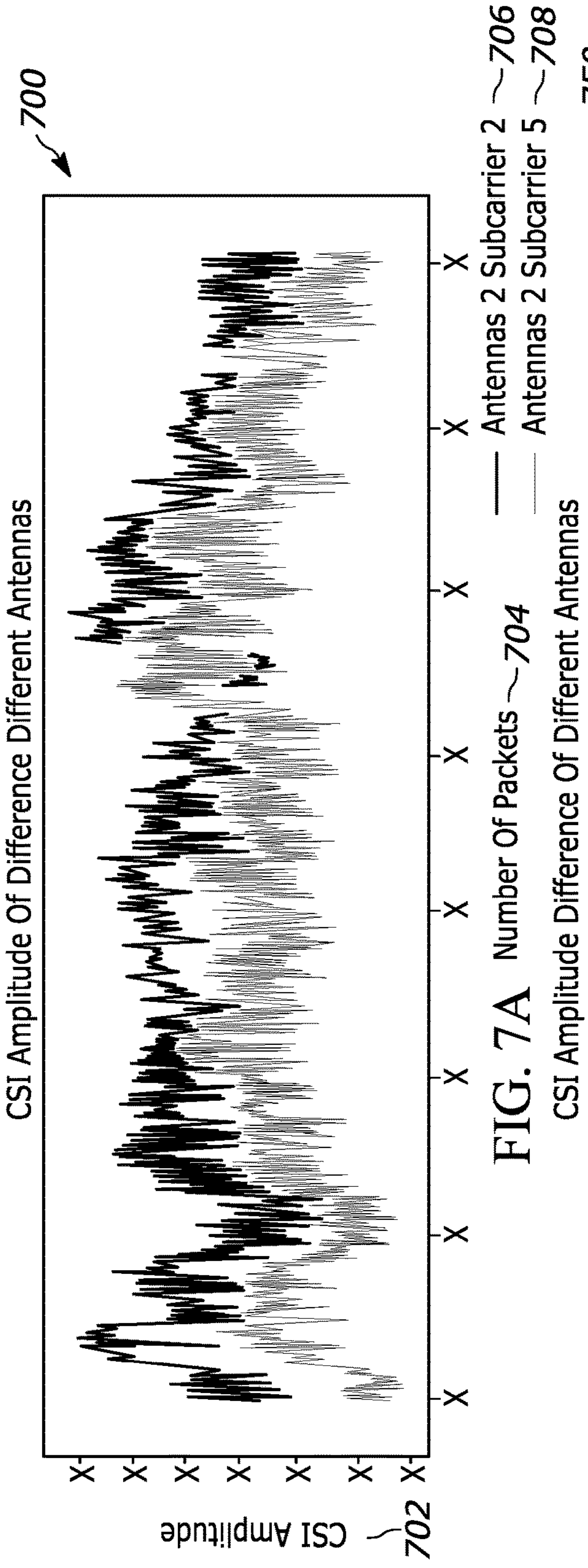
FIG. 7A is a graphical representation of amplitude of two antennas when a target is at the left side.

FIG. 7A is a graphical representation of amplitude 700 of two antennas when a target is at the left side. In this graph, CSI amplitude 702 is plotted with respect to number of packets 704 in which the two lines are antenna 1, subcarrier 1 706 and antenna 2 subcarrier 1 708

Figure 7B:
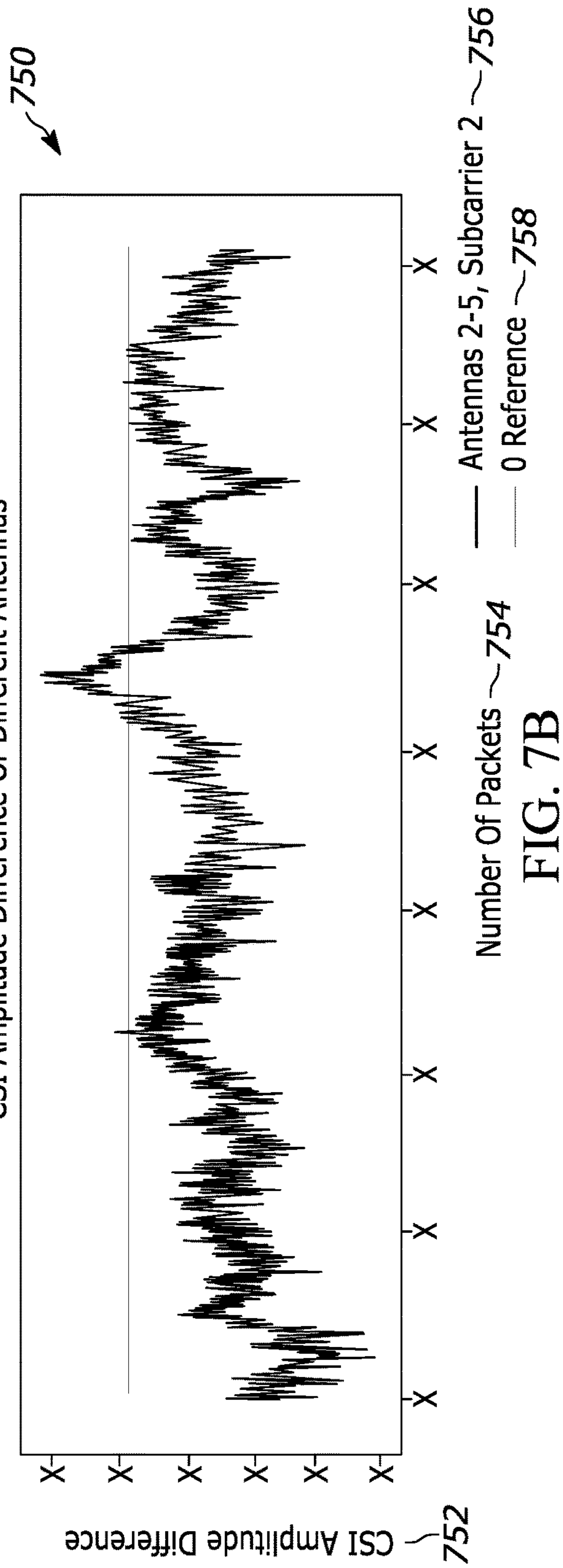
FIG. 7B is a graphical representation of amplitude difference between two antennas when a target is at the left side.

FIG. 7B is a graphical representation of amplitude difference 750 between two antennas when a target is at the left side. In this graph, CSI amplitude difference 752 is plotted with respect to number of packets 754 in which the two lines are amplitude difference 758 and a reference line 760

Amplitude Difference-Based Approach:

There are several ways amplitude difference between antennas can be used to determine the side of the rider:

Approach 1: It consists of the following steps:

a. CSI data is collected using a sliding window of W seconds wide with L seconds stride length. Parameters W and L can be configured. In one embodiment, W was set to 3 seconds and L was set to 0.4 seconds.
b. CSI amplitudes are computed for all Wi-Fi packets on all subcarriers using complex CSI values. Some sample CSI amplitudes from two antennas are shown in FIGS. 6A and 7A when the rider is at the right and left side, respectively.
c. CSI amplitude differences are computed for all corresponding subcarriers of two antennas. Some sample CSI amplitude differences between two antennas are shown in FIGS. 6B and 7B when the rider is at the right and left side, respectively. It shows the amplitude difference is mostly positive when the rider is at the right side and the difference is mostly negative when the rider is at the left side.
d. In one embodiment, no subcarrier selection is performed, and all the subcarriers are used. The average amplitude difference of all the subcarriers is used as a feature to a classifier.
e. A binary classifier (e.g., KNN, SVM, decision tree) is used to determine the side of the rider in each sliding window using the feature computed above.

The corresponding computing pipeline is shown in FIG. 4.

Approach 2: It follows similar steps as Approach 1. However, in step (d), subcarrier selection is performed based on the variance of CSI amplitude difference using the following step.

a. Subcarriers with the largest variance of amplitude differences are selected, and the average amplitude difference of all the selected subcarriers is used as a feature to a classifier.

The corresponding computing pipeline is shown in FIG. 4.

Approach 3: It follows similar steps as Approach 1. However, in step (d), subcarrier selection is performed based on covariance of the CSI amplitude difference using the following steps.

a. The covariances of CSI amplitude of each subcarrier of the first antenna to every other subcarrier of its own are computed.
b. Subcarriers with the largest covariance are selected.
c. For each selected subcarrier of the first antenna, covariances with CSI amplitude of all subcarriers of the second antenna are computed.
d. Subcarriers are selected from the second antenna without repetition selection with the highest covariances.

The corresponding computing pipeline is shown in FIG. 4.

Approach 4: It follows similar steps as Approach 3. However, in step (d), subcarrier selection is performed with the permission to select the same subcarrier of the second antenna for different selected subcarriers of the first antenna.

Approach 5: It follows similar steps as Approach 1. However, directional Wi-Fi antennas are used instead of omnidirectional antennas.

Phase Difference-Based Approach

There are several ways phase difference between antennas can be used to determine the side of the rider:

Approach 1: It consist of the following steps:

a. CSI data is collected using a sliding window of W seconds wide with L seconds stride length. Parameters W and L can be configured. In one embodiment, W was set to 3 seconds and L was set to 0.4 seconds.
b. The CSI wrapped phases are computed for all Wi-Fi packets on all subcarriers using complex CSI values.
c. At this step, the phases of CSI values of both antennas are unwrapped at each subcarrier. In another embodiment, A synchronized phase unwrapping technique is used that takes the CSI wrapped phase of the same subcarriers of two antennas. For each CSI data, if one of the wrapped phase differences between packets in one antenna is larger than $\pi$ and wrapped phase differences between corresponding packets in the other antenna is larger than $\pi$-$\delta$, these two wrapped phases are unwrapped simultaneously. Otherwise, they are not unwrapped. In one embodiment, $\delta$ is set to 0.2. FIG. 10 is an example of conventional phase unwrapping, but this can also be illustrated as synchronized.
d. A sub-window segmentation of M Wi-Fi packets is used in each sliding window. Parameters M can be configured. In one embodiment, M was set to 100.
e. CSI unwrapped phase differences are computed on corresponding subcarriers of two antennas.
f. The average phase difference of all the subcarriers is used as a feature to a classifier.

g. A binary classifier (e.g., KNN, SVM, decision tree) is used to determine the side of the rider in each sliding window using the feature computed above.

Figure 8:
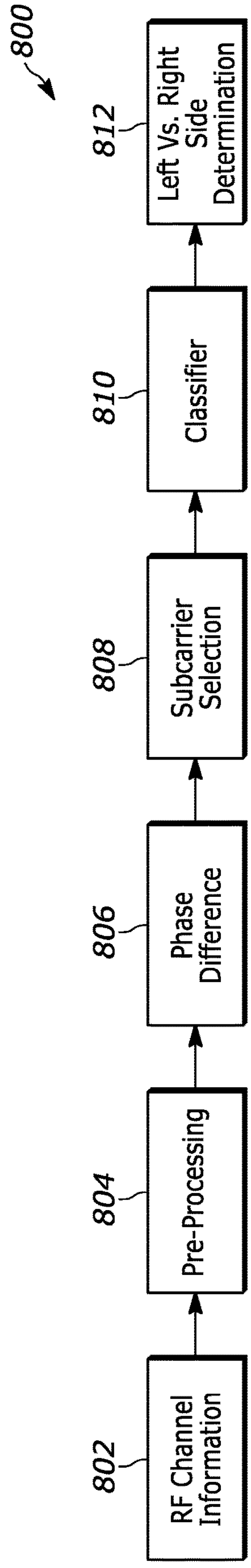
FIG. 8 is a flow diagram of phase-based target side of the road determination.

The corresponding computing pipeline is shown in FIG. 8.

The synchronized phase unwrapping technique is shown in FIG. 9.

FIG. 8 is a flow diagram of phase unwrapping 800 based target side of the road determination. The channel state information is extracted 802 and then preprocessed 804, followed by a phase difference 906 going to subcarrier selection 808 then a classifier 810, and determination of the side 812.

Approach 2: It follows similar steps as Approach 1. However, in step (f), average phase differences of all the subcarriers in each sub-window are computed. A majority voting is performed for all average phase differences based on the sign of their values (positive or negative). The average majority vote is computed over all sub-windows and used as a feature to a classifier.

Approach 3: It follows similar steps as Approach 1. However, in step (f), the effective phase differences for each Wi-Fi packet are computed by minimizing the absolute mean error on all the subcarriers. X percent of outliers (packets) are removed. Parameters X can be configured. In one embodiment, X was set to 20. The average of average phase differences over all packets is computed and used as a feature to a classifier.

Approach 4: It follows similar steps as Approach 1. However, in step (f), the effective phase differences for each subcarrier are computed by minimizing the absolute mean error on all the subcarriers. X percent of outliers (subcarriers) are removed. Parameters X can be configured. In one embodiment, X was set to 20. The average of average phase differences over all subcarriers is computed and used as a feature to a classifier.

Approach 5: It follows similar steps as Approach 1. However, in step (f), the average phase differences of all subcarriers are computed for all sub-windows. X percent of sub-windows with the largest phase difference variances are removed. Parameters X can be configured. In one embodiment, X was set to 20. The numbers of positive and negative average phase differences are counted and used as features to a classifier.

Approach 6: It follows similar steps as Approach 3. However, the effective phase differences are computed using only phase differences within U units to themselves. Parameters U can be configured. In one embodiment, U was set to 2.

Approach 7: It follows similar steps as Approach 6. However, instead of using Approach 3 in step (f), it uses approach 4.

Approach 8: It follows similar steps as Approach 7. However, all average phase differences over all subcarriers are used as features to a classifier.

Data Driven Approach

There are several ways AI based techniques can be used for rider side determination:

Approach 1: It consists of the following steps:

a. CSI data is collected using a sliding window of W seconds wide with L seconds stride length. Parameters W and L can be configured. In one embodiment, W was set to 3 seconds and L was set to 0.4 seconds.

b. CSI amplitudes are computed for all Wi-Fi packets on all subcarriers using CSI complex raw data.

c. CSI amplitude differences are computed for all corresponding subcarriers of two antennas.

d. Subcarrier selection described in Approach A (3) is performed and S subcarriers are selected. In one embodiment, S is set to 11.

e. A Long Short-term Memory (LSTM) neural network is used as a binary classifier. In one embodiment, it has input size of 11; 3 LSTM layers with 256 hidden nodes. They are followed by a linear layer with input size of 256, and output size of 2. A Softmax layer is after the linear layer.

f. For the training hyper-parameters, in one embodiment, the training uses cyclic learning rate with 5e-4 initial learning rate; maximum epochs of 1000; patience of 200; and the cross-entropy loss.

g. The amplitude difference series of the selected subcarriers are used as input of the LSTM neural network and the output of the LSTM neural network is used to determine the side of the rider.

The corresponding LSTM neural network is shown in FIG. 5.

Approach 2: It follows similar steps as Approach 1. However, at step (b), (c), and (d), amplitude difference based features and phase difference based features are used as mentioned above in approaches A and B.

In another embodiment, instead of LSTM, its variants are used, e.g., Recurrent Neural Networks (RNN), bidirectional LSTM, Gated Recurrent Unit (GRU) and transformer networks.

In another embodiment, a combination of the phase difference and amplitude difference-based approach or a combination of several aforementioned methods is used.

After the side of the rider is estimated at the driver side, this information is shared with the smartphone of the rider using cellular connection. This information is visualized at the rider's phone in a way that shows the relative side of the car with respect to the rider.

In another embodiment, instead of just using Wi-Fi, other wireless technologies are used, including but not limited to Bluetooth, Ultra-wideband, or a combination of several.

Experimental Validation: An experimental study to determine the street side of a rider using Wi-Fi CSI was performed. There were three Wi-Fi antennas mounted on a dashboard. The Wi-Fi antennas were connected to an Intel 5300 chipset, which was integrated into a laptop. For this analysis, this antenna array and laptop constitutes HardwareX. The car was driven several times while the rider is on the left and right side of the car. The rider was holding a smartphone. There was an Android app running on the smartphone that was generating Wi-Fi traffic.

As seen by FIGS. 6B and 7B, when the rider is at the right, the amplitude difference is mostly positive and when the rider is at the left side, the amplitude difference is mostly negative, respectively.

Rider Proximity Detection Using Wireless Signals

The following steps are taken to help drivers to determine if their riders are in proximity to their cars:

When the driver is reaching close to the rider (e.g., when they are within 0.5 mile radius of each other as detected by the GPS signals), two actions are taken:

A. The smartphone of the rider starts to transmit Wi-Fi packets

B. The HardwareX of the driver starts to listen to incoming Wi-Fi signals

Wi-Fi has a range of about 100 meters in outdoors. When the driver and the riders are within this range, one or more Wi-Fi packets generated by the smartphone of the rider are received by the HardwareX of the driver.

The MAC address of the rider's smartphone is shared with the HardwareX so that HardwareX knows which messages to listen (in other words, which messages are coming from the rider's phone). To ensure regulatory compliance, rider's approval is obtained before sharing the MAC address. Further, to protect security and privacy, a temporary MAC address can also be assigned to the rider which is used for creating these messages. MAC address can be generated in two ways:

A. The ride app provider creates temporary MAC address which it shares with both rider's phone and HardwareX.

B. The smartphone creates a temporary MAC address and informs the ride app which then informs the HardwareX.

When a Wi-Fi packet is received at the HardwareX, the associated Received Signal Strength Indicator (RSSI) is extracted from the packet.

The RSSI value is then used to determine the proximity of the rider.

If the RSSI value is higher than a threshold, $T_1$ then we conclude the rider is nearby.

Figure 13A:
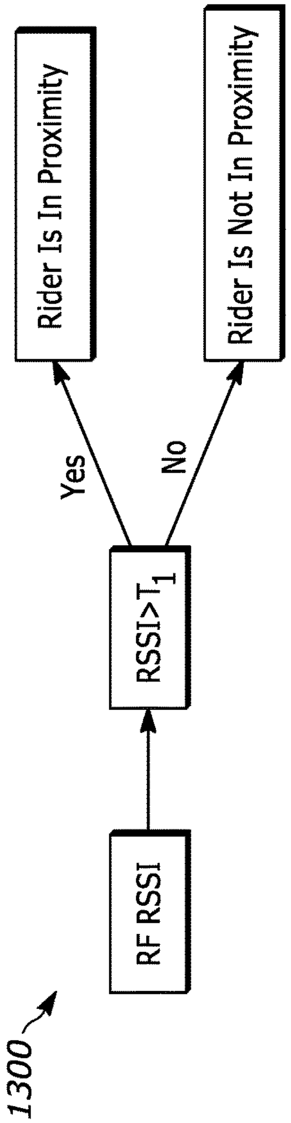
FIG. 13A is a flow diagram of RSSI-based target range determination.

The computing pipeline is shown in FIG. 13A.

FIG. 13A is a flow diagram of RSSI-based target range determination 1300.

The proximity information is updated continuously in real-time as the car moves and newer Wi-Fi packets are received from the smartphone of the rider.

Figure 13B:
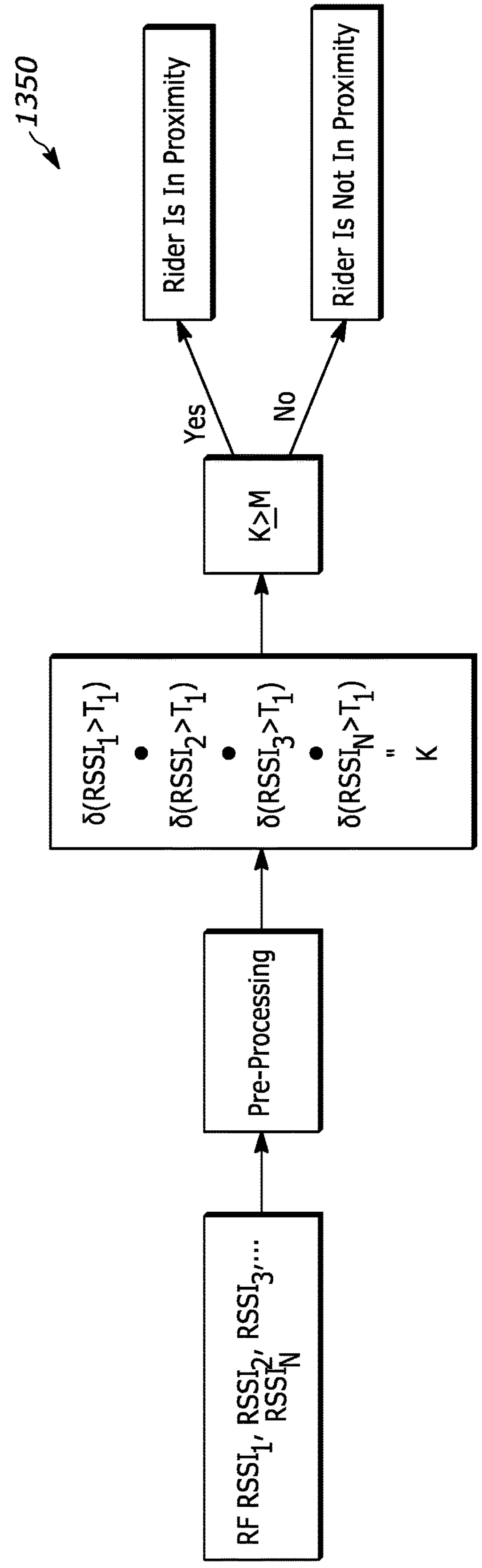
FIG. 13B is another flow diagram of RSSI-based target range determination.

In another embodiment, instead of using a single RSSI from a single packet, a sequence of N RSSI values from a sequence of N Wi-Fi packets are processed together to determine the proximity of the rider. In that case, at first, the RSSI sequence is denoised using some filtering techniques in the preprocessing step. Then, for each RSSI, it is checked if the RSSI value is higher than a threshold $T_1$. If M number of packets have higher RSSI values than $T_1$, then, it is assumed that the rider is in proximity. The corresponding computing pipeline is shown in FIG. 13B. The δ(condY) function returns 1 if the input condY is evaluated to be true. Otherwise, it returns 0.

FIG. 13B is another flow diagram of RSSI-based target range determination 1350.

In another embodiment, instead of showing a proximity, a range of proximities are visualized. For example, instead of showing the rider is within a 10 meters radius, the solution shows whether the rider is within a 10 meters, 20 meters, and 30 meters radius (the numbers are for explanations and subject to change). This can be done using the aforementioned methods by having one RSSI threshold $T_i$ per radius.

After the proximity of the rider is estimated at the driver side, this information is shared with the smartphone of the rider using cellular connection. This information is visualized at the rider's phone in a way that shows the relative proximity of the car with respect to the rider.

In another embodiment, instead of a single antenna, multiple antennas are utilized. These antennas can be connected to the radio chip directly supporting multiple antenna connections or via an antenna switch. The core idea is to collect signal strengths at different antennas in round robin method. The proximity decision is then based on one or more of following strategies:

A. Signal strength above pre-determined threshold on any one of antennas

B. Signal strength above pre-determined threshold on all the antennas

In another embodiment, antennas could be one or more directional antennas. Switching between then can focus on specific location and providing zone information along with proximity.

The RSSI thresholds are adjusted based on the sensitivity of the Wi-Fi chipsets of riders' smartphones and the drivers' smartphones or HardwareX.

In another embodiment, instead of just using Wi-Fi, other wireless technologies are used, including but not limited to Bluetooth, Ultra-wideband, or a combination of several.

Experimental Validation:

We perform an experimental study to determine the proximity of a rider using Wi-Fi Received Signal Strength Indicator (RSSI). For example, consider a rider standing at different distances (1 meter, 3 meter, 5 meter, 10 meter, 20 meter, 30 meter) from the car at each quadrant from the car (front right, front left, rear right, rear left). As a result, the rider was standing at 24 different locations. It also shows that the rider was facing the car with a smartphone in the hand.

During testing, over 111,000 Wi-Fi packets were transmitted from each location. Each Wi-Fi packet was received by an intel 5300 Wi-Fi chipset attached to a laptop placed inside a car. It had 3 antennas attached to it. It serves as our HardwareX for data collection.

Figure 14A:
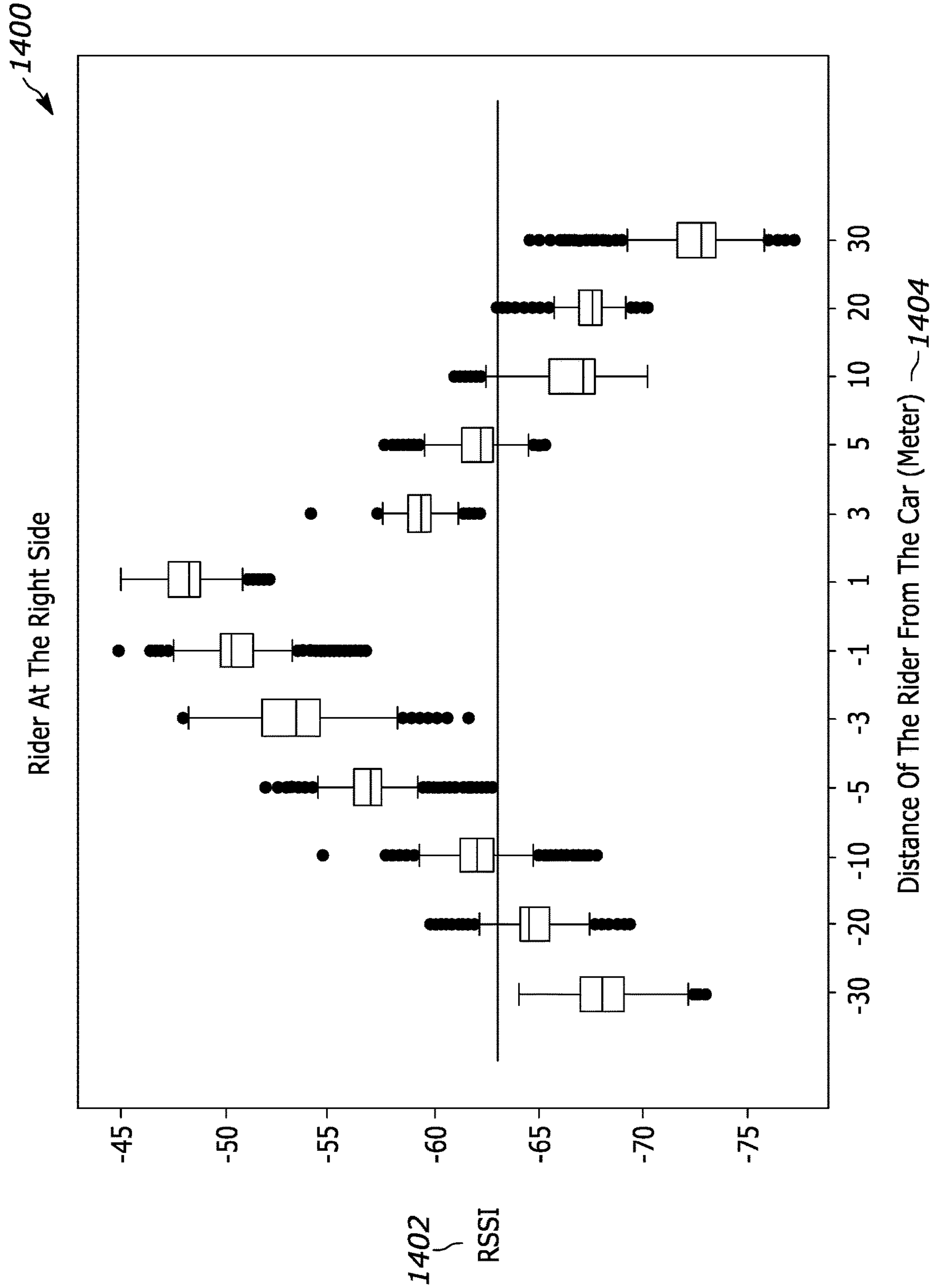
FIG. 14A is a graphical representation of a box plot of RSSI at different distances between a target and vehicle when the target is on the right side.
Figure 14B:
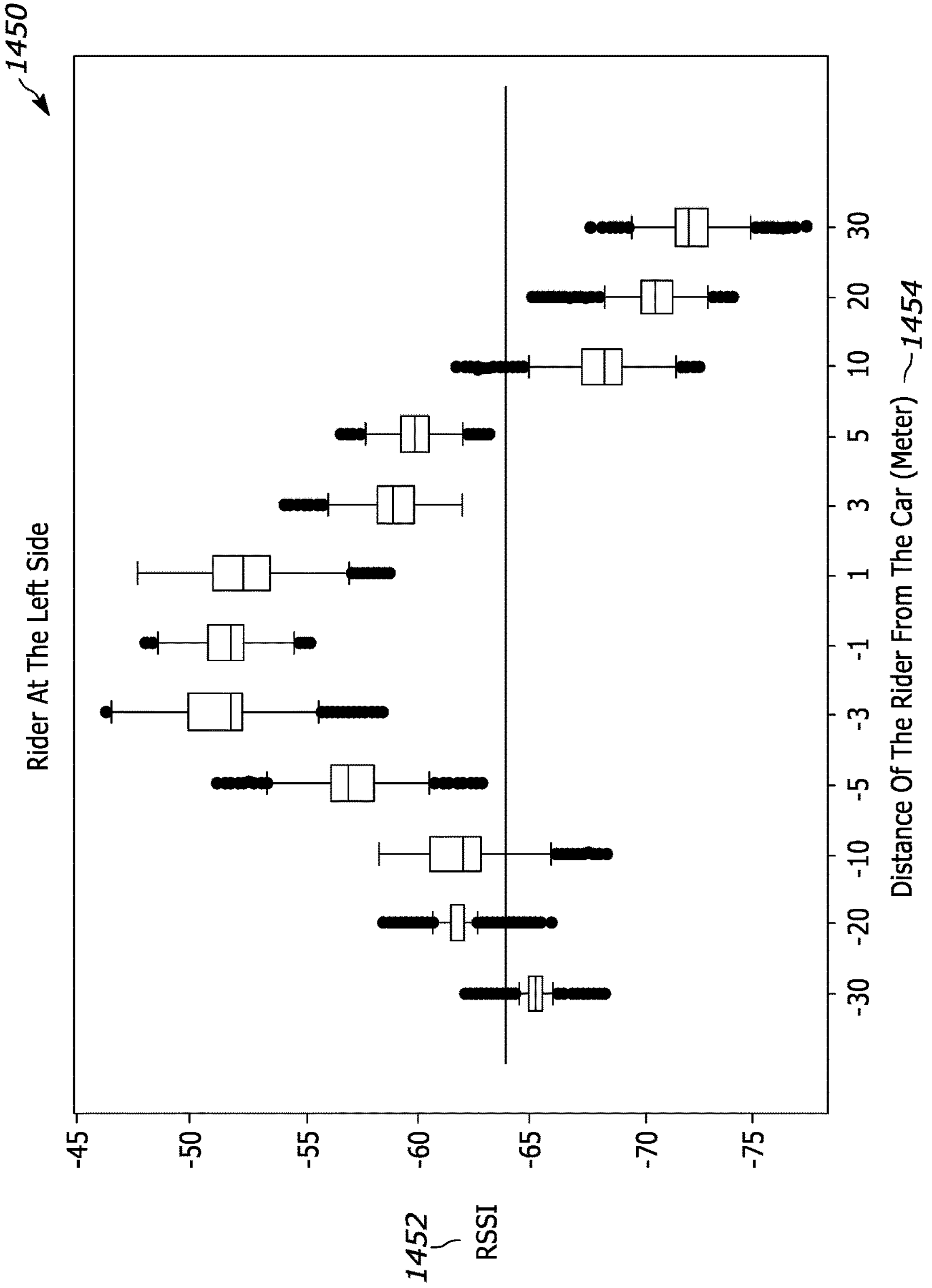
FIG. 14B is a graphical representation of a box plot of RSSI at different distances between a target and vehicle when the target is on the left side.

A standard size sedan is about 5 meters. Therefore, a proximity radius to be 10 meters for this study was appropriate. FIGS. 14A and 14B show the boxplot of change of RSSI values when the rider is at different distances from the car from −30 meters to +30 meters when the rider is at the right side and left side, respectively. These show that if we choose $T_1=-63$, the RSSI values are higher than −63 most of the time when the rider is within ±10 meters radius in both cases (left and right). As a result, when a Wi-Fi packet is received, if the RSSI value is higher than −63 and we declare the rider is nearby, the solution will work in general.

FIG. 14A is a graphical representation of a box plot of RSSI 1400 at different distances between a target and vehicle when the target is on the right side. This graphical representation illustrates RSSI 1402 with respect to distance of the target to the vehicle 1404 in a box plot format.

FIG. 14B is a graphical representation of a box plot of RSSI 1450 at different distances between a target and vehicle when the target is on the left side. This graphical representation illustrates RSSI 1452 with respect to distance of the target to the vehicle 1454 in a box plot format FIG. 15 is a block diagram illustrating a computing device 1500 (e.g., HardwareX, UE 106, and a vehicle system 108 such as a vehicle infotainment system as discussed above) showing an example of a client device or server device used in the various embodiments of the disclosure.

Figure 15:
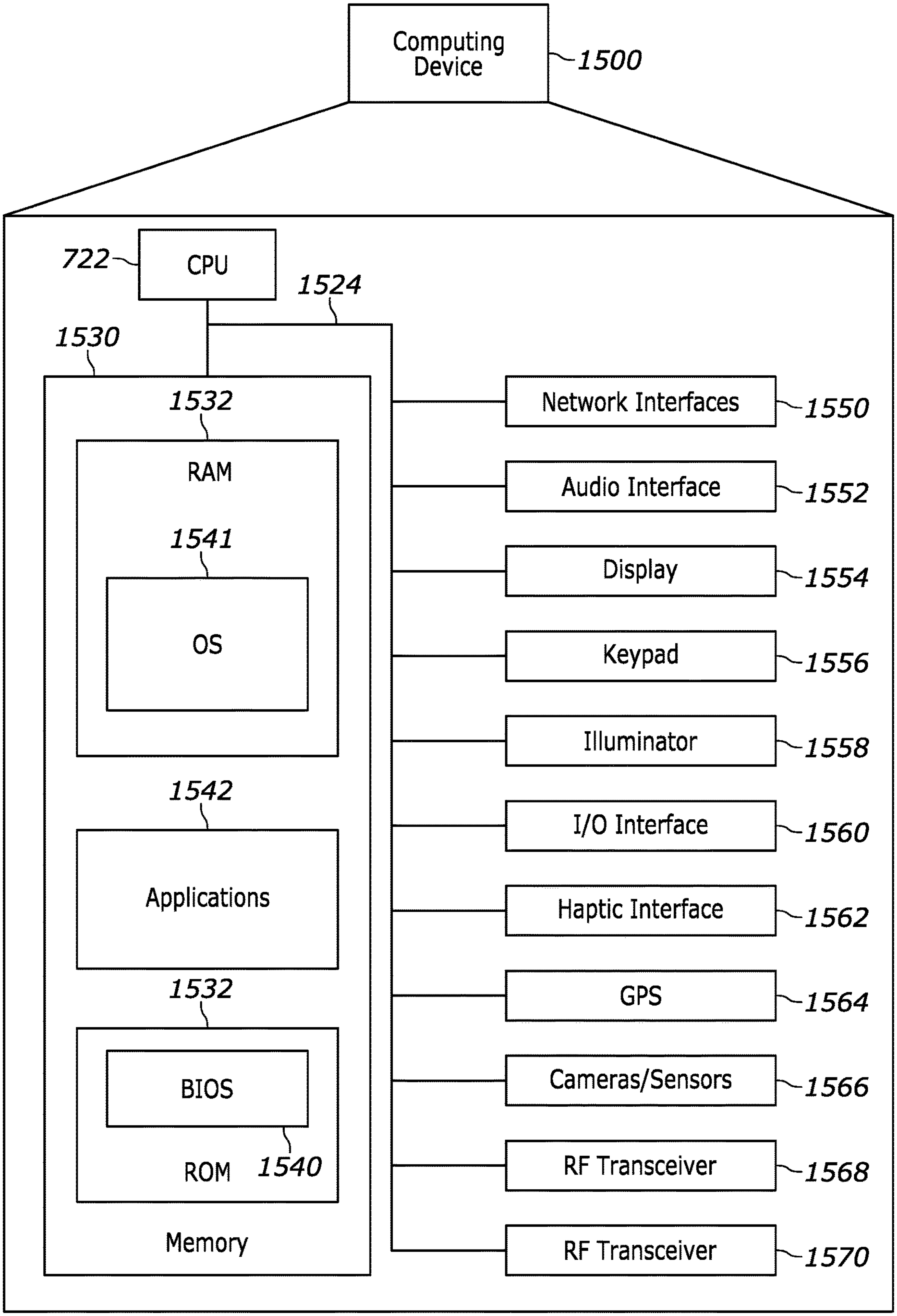
FIG. 15 is a block diagram illustrating a computing device showing an example of a device used in various embodiments of the present disclosure.

The computing device 1500 may include more or fewer components than those shown in FIG. 15, depending on the deployment or usage of the device 1500. For example, a server computing device, such as a rack-mounted server, may not include audio interfaces 1552, displays 1554, keypads 1556, illuminators 1558, haptic interfaces 1562, GPS receivers 1564, or cameras/sensors 1566. Some devices may include additional components not shown, such as GPU devices, cryptographic co-processors, AI accelerators, or other peripheral devices.

As shown in FIG. 15, the device 1500 includes a central processing unit (CPU) 1522 in communication with a mass memory 1530 via a bus 1524. The computing device 1500 also includes one or more network interfaces 1550, an audio interface 1552, a display 1554, a keypad 1556, an illuminator 1558, an input/output interface 1560, a haptic interface

1562, an optional GPS receiver 1564 (and/or an interchangeable or additional GNSS receiver) and a camera(s) or other optical, thermal, or electromagnetic sensors 1566. Device 1500 can include one camera/sensor 1566 or a plurality of cameras/sensors 1566. The positioning of the camera(s)/sensor(s) 1566 on the device 1500 can change per device 1500 model, per device 1500 capabilities, and the like, or some combination thereof. Device 1500 can include a first wireless transceiver 1568 capable of connecting to a first wireless network and a second wireless transceiver 1570 capable to connecting to a second wireless network. Here one transceiver may be capable of long-range communication and the second may be capable of medium-range communication.

The first radio frequency (RF) transceiver 1568 may comprise a transceiver configured to operate over a wireless network as described above in which a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi (e.g., IEEE 802.11 and other variants), Long Term Evolution (LTE), WLAN, Wireless Router (WR) mesh, or 2nd, 3rd, $4^{th}$ or $5^{th}$ generation (e.g., 3GPP's 2G, 3G, 4G, 5G, etc.) cellular technology, mobile edge computing (MEC), Bluetooth, 802.11b/g/n, or the like. Network access technologies may enable wide area coverage for devices, such as client devices with varying degrees of mobility, for example. A long-range transceiver includes systems intended to be capable and practical in communication over a distance of greater than 100 meters, examples include satellite and cellular (analog, CDMA, TDMA, 2G, 3G, 4G, LTE, 5G, etc.), while a medium-range transceiver include systems designed to operate distances less than 100 m, examples include 802.11 Wi-Fi, Bluetooth, Ultra-wide band (UWB).

The second radio frequency (RF) transceiver 1570 may comprise a transceiver capable to connecting to a second wireless network.

In some embodiments, the CPU 1522 may comprise a general-purpose CPU. The CPU 1522 may comprise a single-core or multiple-core CPU. The CPU 1522 may comprise a system-on-a-chip (SoC) or a similar embedded system. In some embodiments, a GPU may be used in place of, or in combination with, a CPU 1522. Mass memory 1530 may comprise a dynamic random-access memory (DRAM) device, a static random-access memory device (SRAM), or a Flash (e.g., NAND Flash) memory device. In some embodiments, mass memory 1530 may comprise a combination of such memory types. In one embodiment, the bus 1524 may comprise a Peripheral Component Interconnect Express (PCIe) bus. In some embodiments, the bus 1524 may comprise multiple busses instead of a single bus.

Mass memory 1530 illustrates another example of computer storage media for the storage of information such as computer-readable instructions, data structures, program modules, or other data. Mass memory 1530 stores a basic input/output system ("BIOS") 1540 for controlling the low-level operation of the computing device 1500. The mass memory also stores an operating system 1541 for controlling the operation of the computing device 1500.

Applications 1542 may include computer-executable instructions which, when executed by the computing device 1500, perform any of the methods (or portions of the methods) described previously in the description of the preceding Figures. In some embodiments, the software or programs implementing the method embodiments can be read from a hard disk drive (not illustrated) and temporarily stored in RAM 1532 by CPU 1522. CPU 1522 may then read the software or data from RAM 1532, process them, and store them to RAM 1532 again.

The computing device 1500 may optionally communicate with a base station (not shown) or directly with another computing device. Network interface 1550 is sometimes known as a transceiver, transceiving device, or network interface card (MC).

The audio interface 1552 produces and receives audio signals such as the sound of a human voice. For example, the audio interface 1552 may be coupled to a speaker and microphone (not shown) to enable telecommunication with others or generate an audio acknowledgment for some action. Display 1554 may be a liquid crystal display (LCD), gas plasma, light-emitting diode (LED), or any other type of display used with a computing device. Display 1554 may also include a touch-sensitive screen arranged to receive input from an object such as a stylus or a digit from a human hand.

Keypad 1556 may comprise any input device arranged to receive input from a user. Illuminator 1558 may provide a status indication or provide light.

The computing device 1500 also comprises an input/output interface 1560 for communicating with external devices, using communication technologies, such as USB, infrared, Bluetooth™, or the like. The haptic interface 1562 provides tactile feedback to a user of the client device.

The optional GPS receiver or transceiver 1564 can determine the physical coordinates of the computing device 1500 on the surface of the Earth, which typically outputs a location as latitude and longitude values. GPS transceiver 1564 can also employ other geo-positioning mechanisms, including, but not limited to, triangulation, assisted GPS (AGPS), E-OTD, CI, SAI, ETA, BSS, or the like, to further determine the physical location of the computing device 1500 on the surface of the Earth. In one embodiment, however, the computing device 1500 may communicate through other components, provide other information that may be employed to determine a physical location of the device, including, for example, a MAC address, IP address, or the like.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "data owner", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

In one embodiment, a system for a vehicle includes a multiple antenna radio frequency (RF) transceiver having an identification (ID) and a processor coupled with the RF transceiver. The processor is configured to receive a request, via a first wireless connection, for the vehicle to travel to a location, in response to the vehicle being less than a predetermined distance from the location, receive RF packets, via a second wireless connection, from a target at the location, identify packets based on the ID of the RF transceiver, extract channel state information (CSI) from received signals associated with the identified packets, determine an amplitude difference of subcarriers of the received signals between each of the multiple antennae, filter noise of the amplitude difference of subcarriers based on subcarrier selection to obtain multiple robust amplitude difference signals, and feed the multiple robust amplitude difference signals to a classifier to obtain a side of the vehicle associated with the location of the target.

In another embodiment, a vehicle side target location method includes receiving a request, via a first wireless connection, for the vehicle to travel to a location, in response to the vehicle being less than a predetermined distance from the location, receiving RF packets, via a second wireless connection having a multiple antenna radio frequency (RF) transceiver having an identification (ID), from a target at the location, identifying packets based on the ID of the RF transceiver, extracting channel state information (CSI) from received signals associated with the identified packets, determining an amplitude difference of subcarriers of the received signals between each of the multiple antennae, filtering noise of the amplitude difference of subcarriers based on subcarrier selection to obtain multiple robust amplitude difference signals, and feeding the multiple robust amplitude difference signals to a classifier to obtain a side of the vehicle associated with the location of the target.

In another embodiment, a system for performing lane selection associated with control of a vehicle, the system includes a multiple antenna radio frequency (RF) transceiver having an identification (ID), a processor, and a memory including instructions. When the instructions are executed by the processor, it causes the processor to receive a request, via a first wireless connection, for the vehicle to travel to a location, in response to the vehicle being less than a predetermined distance from the location, receive RF packets, via a second wireless connection, from a target at the location, identify packets based on the ID of the RF transceiver, extract channel state information (CSI) from received signals associated with the identified packets, determine an amplitude difference of subcarriers of the received signals between each of the multiple antennae, filter noise of the amplitude difference of subcarriers based on subcarrier selection to obtain multiple robust amplitude difference signals, feed the multiple robust amplitude difference signals to a classifier to obtain a side of the vehicle associated with the location of the target, and operate the vehicle to navigate the vehicle to a lane associated with the side of the vehicle.

In one embodiment, a system for a vehicle includes a multiple antenna radio frequency (RF) transceiver having an identification (ID), and a processor coupled with the RF transceiver. The processor is configured to receive a request, via a first wireless connection, for the vehicle to travel to a location, in response to the vehicle being less than a predetermined distance from the location, receive RF packets, via a second wireless connection, from a target at the location, identify packets based on the ID of the RF transceiver, extract channel state information (CSI) from received signals associated with the identified packets, unwrap phase from the CSI of the received signals to obtain subcarrier phase data, determine a phase difference of subcarriers of the received signals between each of the multiple antennae, filter noise of the phase difference based on subcarrier selection to obtain multiple robust phase difference signals, and feed the multiple robust phase difference signals to a classifier to obtain a side of the vehicle associated with the location of the target.

In another embodiment, a vehicle side target location method includes receiving a request, via a first wireless connection, for the vehicle to travel to a location, in response to the vehicle being less than a predetermined distance from the location, receiving RF packets, via a second wireless connection having a multiple antenna radio frequency (RF) transceiver having an identification (ID), from a target at the location, identifying packets based on the ID of the RF transceiver, extracting channel state information (CSI) from received signals associated with the identified packets, unwrapping phase from the CSI of the received signals to obtain subcarrier phase data, determining a phase difference of subcarrier phase data of the received signals between each of the multiple antennae, filtering noise of the phase difference of subcarriers based on subcarrier selection to obtain multiple robust phase difference signals, and feeding the multiple robust phase difference signals to a classifier to obtain a side of the vehicle associated with the location of the target.

In another embodiment, a system for performing lane selection associated with autonomous control of a vehicle includes a multiple antenna radio frequency (RF) transceiver having an identification (ID), a processor coupled with the RF transceiver, and a memory including instructions. When the instructions are executed by the processor, it causes the processor to receive a request, via a first wireless connection, for the vehicle to travel to a location, in response to the vehicle being less than a predetermined distance from the location, receive RF packets, via a second wireless connection, from a target at the location, identify packets based on the ID of the RF transceiver, extract channel state information (CSI) from received signals associated with the identified packets, determine a phase difference of subcarriers of the received signals between each of the multiple antennae, filter noise of the phase difference of subcarriers based on subcarrier selection to obtain multiple robust phase difference signals, feed the multiple robust phase difference signals to a classifier to obtain a side of the vehicle associated with the location of the target, and operate the vehicle to navigate the vehicle to a lane associated with the side of the vehicle.

In one embodiment, a system for a vehicle includes a radio frequency (RF) transceiver having an identification (ID), and a processor coupled with the RF transceiver. The processor is configured to receive a request, via a first wireless connection, for the vehicle to travel to a location, in response to the vehicle being less than a predetermined distance from the location, receive RF packets, via a second wireless connection, from a target at the location, identify packets based on the ID of the RF transceiver, extract received signal strength indicator (RSSI) data from received signals associated with the identified packets, filter the RSSI data to obtain a maximum RSSI signal within a window of time, and in response to the maximum RSSI signal exceeding a threshold, output a signal indicative of the target being less than a predetermined distance from the vehicle.

In another embodiment a system for performing speed control associated with control of a vehicle includes a multiple antenna radio frequency (RF) transceiver having an identification (ID), a processor coupled with the RF transceiver, and a memory including instructions. When the instructions are executed by the processor, it cause the processor to receive a location request, via a first wireless connection, from a remote wireless device at a location, in response to the remote wireless device being less than a predetermined distance from the location, receive RF packets, via a second wireless connection, from the remote wireless device at the location, identify packets based on an ID of the RF transceiver, extract received signal strength indicator (RSSI) data from received signals associated with the identified packets, filter the RSSI data to obtain a maximum RSSI signal within a window of time, in response to the maximum RSSI signal exceeding a threshold, output a signal indicative of the remote wireless device being less than a predetermined distance from the RF transceiver, and operate the vehicle to stop the vehicle based on the signal.

In another embodiment, a method of operating a vehicular infotainment system via a radio frequency (RF) transceiver to locate a remote wireless device includes receiving a location request, via a first wireless connection, for the remote wireless device at a location, identifying packets based on an ID of the RF transceiver, extracting received signal strength indicator (RSSI) data from received signals associated with the identified packets, filtering the RSSI data to obtain a maximum RSSI signal within a window of time, and in response to the maximum RSSI signal exceeding a threshold, outputting a signal indicative of the remote wireless device being less than a predetermined distance from the RF transceiver.

In one embodiment, a mobile device includes a long-range transceiver, a medium-range transceiver, and a controller. The controller is configured to receive, from the long-range transceiver, a medium-range ID associated with a remote medium-range transceiver, transmit, via the long-range transceiver, an ID, channel, and band of the medium-range transceiver, connect, via the medium-range transceiver, to a remote medium-range transceiver based on the medium-range ID, transmit, via the medium-range transceiver, a beacon of data packets at an interval.

In another embodiment, a method of operating a mobile device includes receiving, from a long-range transceiver of the mobile device, a medium-range ID associated with a remote medium-range transceiver, transmitting, via the long-range transceiver, an ID, channel, and band of a medium-range transceiver of the mobile device, and transmitting, via the medium-range transceiver, a beacon of data packets at an interval.

In another embodiment a mobile device includes a cellular transceiver, a Wi-Fi transceiver, and a controller. The controller is configured to receive, from the cellular transceiver, a Wi-Fi ID associated with a remote Wi-Fi transceiver, transmit, via the cellular transceiver, an ID, channel, and band of the Wi-Fi transceiver, and transmit, via the Wi-Fi transceiver, a beacon of data packets at an interval.

In one embodiment a mobile device includes a long-range transceiver, a medium-range transceiver, and a controller. The controller is configured to receive, from the long-range transceiver, a target ID associated with a remote medium-range transceiver of a remote system, transmit, via the long-range transceiver, an ID, channel, and band of the medium-range transceiver of the remote system, receive packets from the remote medium-range transceiver on the channel, extract received signal strength indicator (RSSI) data from the packets, filter the RSSI data to obtain a maximum RSSI signal within a window of time, in response to the maximum RSSI signal exceeding a threshold, output a signal indicative of the remote system being less than a predetermined distance away.

In another embodiment, a method of operating a mobile device via a radio frequency (RF) transceiver to locate a remote wireless device includes receiving a location request, via a first wireless connection, for the remote wireless device at a location, identifying packets based on an ID of the RF transceiver, extracting received signal strength indicator (RSSI) data from received signals associated with the identified packets, filtering the RSSI data to obtain a maximum RSSI signal within a window of time, and in response to the maximum RSSI signal exceeding a threshold, outputting a signal indicative of the remote wireless device being less than a predetermined distance from the RF transceiver.

In another embodiment, a mobile device includes a cellular transceiver, a Wi-Fi transceiver, and a controller. The controller is configured to receive, from the cellular transceiver, a target ID associated with a remote Wi-Fi transceiver of a remote system, transmit, via the cellular transceiver, an ID, channel, and band of the Wi-Fi transceiver of the remote system, receive packets from the remote Wi-Fi transceiver on the channel, extract received signal strength indicator (RSSI) data from the packets, filter the RSSI data to obtain a maximum RSSI signal within a window of time, in response to the maximum RSSI signal exceeding a threshold, output a signal indicative of the remote system being less than a predetermined distance away.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The present application is related to co-pending application Ser. No. 17/876,256, filed Jul. 28, 2022 with the titled VEHICLE TO TARGET RANGE FINDER VIA RF POWER. The present application is also related to U.S. Pat. No. 12,455,168, issued Oct. 28, 2025, with the titled VEHICLE ROAD SIDE IDENTIFICATION OF A TARGET VIA DIFFERENTIAL AMPLITUDE RF SIGNALS. The present application is also related to issued U.S. Pat. No. 12,382,247, issued Aug. 5, 2025 with the titled VEHICLE ROAD SIDE LOCATION OF A TARGET VIA UNWRAPPED DIFFERENTIAL PHASE RF SIGNALS. The present application is also related to co-pending application Ser. No. 17/876,277, filed Jul. 28, 2022 with the titled MOBILE DEVICE RANGE FINDER VIA RF POWER. Those applications are incorporated herein by reference in their entirety, but they are not admitted to be prior art with respect to the present application by mention in this cross-reference section.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A mobile device comprising:

a long-range transceiver;

a medium-range transceiver; and a controller configured to:

receive, from the long-range transceiver, a medium-range ID associated with a remote medium-range transceiver, transmit, via the long-range transceiver, an ID, channel, and band of the medium-range transceiver, connect, via the medium-range transceiver, to the remote medium-range transceiver based on the medium-range ID received from the long-range transceiver, transmit, to the remote medium-range transceiver via the connected medium-range transceiver, a beacon of data packets at an interval.

2. The mobile device of claim 1, wherein the medium-range transceiver is configured to support at least one of 802.11 (Wi-Fi), Ultra-Wide Band (UWB), and Bluetooth (BT).

3. The mobile device of claim 1, wherein the long-range transceiver is cellular or satellite, and the medium-range transceiver is 802.11 (Wi-Fi), Ultra-Wide Band (UWB), Bluetooth (BT), dedicated short-range communication (DSRC), or long-range communication (LoRa).

4. The mobile device of claim 1, wherein the remote medium-range transceiver is configured as an access point and the mobile device is configured as a client to the remote medium-range transceiver.

5. The mobile device of claim 1, wherein the mobile device is configured as an access point and the remote medium-range transceiver is configured as a client to the mobile device.

6. The mobile device of claim 1, wherein the mobile device selects a channel and band based on RF traffic to minimize interference and transmits the channel and band to the remote long-range transceiver.

7. The mobile device of claim 1, wherein the mobile device is configured to monitor an ID, channel, and band associated with the remote medium-range transceiver.

8. A method of operating a mobile device comprising:

receiving, from a long-range transceiver of the mobile device, a medium-range ID associated with a remote medium-range transceiver;

transmitting, via the long-range transceiver, an ID, channel, and band of a medium-range transceiver of the mobile device; and transmitting, via the medium-range transceiver, a beacon of data packets at an interval.

9. The method of claim 8, further comprising, after transmitting the ID, channel, and band, connecting to a remote medium-range transceiver via the medium-range transceiver of the mobile device based on the channel and band.

10. The method of claim 8, wherein the long-range transceiver is cellular or satellite, and the medium-range transceiver is 802.11 (Wi-Fi), Ultra-Wide Band (UWB), Bluetooth (BT), dedicated short-range communication (DSRC), or long-range communication (LoRa).

11. The method of claim 8, wherein the remote medium-range transceiver is configured as an access point and the mobile device is configured as a client to the remote medium-range transceiver.

12. The method of claim 8, wherein the mobile device is configured as an access point and the remote medium-range transceiver is configured as a client to the mobile device.

13. The method of claim 8, wherein the mobile device selects a channel and band based on RF traffic to minimize interference and transmits the channel and band to a remote long-range transceiver coupled with the medium-range transceiver.

14. The method of claim 8, wherein the mobile device is configured to monitor an ID, channel, and band associated with the remote medium-range transceiver.

15. A mobile device comprising:

a cellular transceiver;

a Wi-Fi transceiver; and a controller configured to:

receive, from the cellular transceiver, a Wi-Fi ID associated with a remote Wi-Fi transceiver, transmit, via the cellular transceiver, an ID, channel, and band of the Wi-Fi transceiver, and transmit, via the Wi-Fi transceiver, a beacon of data packets at an interval.

16. The mobile device of claim 15, wherein the remote Wi-Fi transceiver is configured as an access point and the mobile device is configured as a client to the remote Wi-Fi transceiver.

17. The mobile device of claim 15, wherein the mobile device is configured as an access point and the remote Wi-Fi transceiver is configured as a client to the mobile device.

18. The mobile device of claim 15, wherein the mobile device selects a channel and band based on RF traffic to minimize interference and transmits the channel and band to the remote cellular transceiver.

19. The mobile device of claim 15, wherein the mobile device is configured to monitor an ID, channel, and band associated with the remote Wi-Fi transceiver.

20. The mobile device of claim 15, wherein the controller is further configured to connect, via the Wi-Fi transceiver, to a remote Wi-Fi transceiver based on the Wi-Fi ID.

* * * * *